US011384848B2

(12) United States Patent
Gagne et al.

(10) Patent No.: US 11,384,848 B2
(45) Date of Patent: Jul. 12, 2022

(54) ENCAPSULATED SYSTEM FOR PRESSURIZED FLUID PROCESSES

(71) Applicant: Repligen Corporation, Waltham, MA (US)

(72) Inventors: Michael C. Gagne, Carson City, NV (US); Dean C. Richards, Simi Valley, CA (US); Steven V. Cates, Corona, CA (US)

(73) Assignee: Repligen Corporation, Waltham, MA (US)

( * ) Notice: Subject to any disclaimer, the term of this patent is extended or adjusted under 35 U.S.C. 154(b) by 0 days.

(21) Appl. No.: 16/994,436

(22) Filed: Aug. 14, 2020

(65) Prior Publication Data

US 2021/0033203 A1    Feb. 4, 2021

Related U.S. Application Data

(63) Continuation of application No. 15/535,601, filed as application No. PCT/US2015/065901 on Dec. 15, 2015, now Pat. No. 10,760,694.

(Continued)

(51) Int. Cl.
*F16K 7/04*    (2006.01)
*F16L 57/02*    (2006.01)
(Continued)

(52) U.S. Cl.
CPC ............ *F16K 7/04* (2013.01); *F16K 27/0236* (2013.01); *F16L 57/00* (2013.01); *F16L 57/02* (2013.01); *F16L 2201/20* (2013.01)

(58) Field of Classification Search
USPC ...................................................... 251/4–10
See application file for complete search history.

(56) References Cited

U.S. PATENT DOCUMENTS 1,860,203 A ‡ 5/1932 Rishel .................. F16L 59/022
                                                   138/14
2,825,524 A ‡ 3/1958 Fox ........................ F16K 7/061
                                                   137/317

(Continued)

FOREIGN PATENT DOCUMENTS

CN        101304166             5/2008
CN        101304166 A ‡         5/2008

(Continued)

OTHER PUBLICATIONS

Hotta, JP-08219355-A, 1996 (Year: 1996).*

(Continued)

*Primary Examiner* — Daphne M Barry
(74) *Attorney, Agent, or Firm* — KDB Firm PLLC

(57) ABSTRACT

Fluid management systems for handling pressurized fluid connect various subsystems or subunits without the need to use reinforced tubing. The system utilizes one or more segments of unreinforced conduit that are encapsulated at various points along a length of the segment with one or more rigid encapsulating members. The unreinforced conduit may be made a disposable element while the rigid encapsulating members may be re-used. In one aspect, the encapsulating member may include a two-part valve body that surrounds and encapsulates a portion of the unreinforced conduit. In another aspect, the encapsulating member may include a two-part jacket that surrounds and encapsulates a portion of the unreinforced conduit. The two-part valve bodies and two-part jackets may be joined at various points within the system as part of the overall flow system.

13 Claims, 37 Drawing Sheets

Related U.S. Application Data

(60) Provisional application No. 62/094,829, filed on Dec. 19, 2014.

(51) Int. Cl.
   *F16K 27/02* (2006.01)
   *F16L 57/00* (2006.01)

(56) References Cited

U.S. PATENT DOCUMENTS

| | | | | |
|---|---|---|---|---|
| 2,931,387 A ‡ | 4/1960 | Fleming | ............... | F16K 7/063 137/883 |
| 2,964,285 A ‡ | 12/1960 | Bardet | ............... | F16K 7/07 251/5 |
| 3,153,546 A ‡ | 10/1964 | Dunn | ............... | F16L 59/11 285/13 |
| 3,245,432 A ‡ | 4/1966 | Pusch | ............... | F16L 59/022 138/15 |
| 3,285,563 A ‡ | 11/1966 | Clarkson | ............... | F16K 7/061 251/8 |
| 3,826,461 A ‡ | 7/1974 | Summerfield | ............... | F16K 7/123 251/7 |
| 4,135,550 A ‡ | 1/1979 | Andersson | ............... | F16K 7/07 137/565.14 |
| 4,895,341 A * | 1/1990 | Brown | ............... | F16K 7/061 251/63.4 |
| 5,098,060 A ‡ | 3/1992 | Mogler | ............... | F16K 7/065 251/251 |
| 5,197,708 A ‡ | 3/1993 | Campau | ............... | F16K 7/061 251/4 |
| 5,350,290 A ‡ | 9/1994 | Honings | ............... | A21C 5/00 137/883 |
| 5,540,255 A ‡ | 7/1996 | Trueb | ............... | F16L 59/11 137/375 |
| 6,012,339 A * | 1/2000 | Genack | ............... | G01F 1/075 73/861.88 |
| 6,196,519 B1 ‡ | 3/2001 | Utterberg | ............... | A61M 39/284 251/10 |
| 6,554,589 B2 ‡ | 4/2003 | Grapes | ............... | F04B 43/08 251/7 |
| 6,976,664 B2 ‡ | 12/2005 | Welch | ............... | F16K 7/04 251/4 |
| 7,383,853 B2 ‡ | 6/2008 | Welch | ............... | F16L 55/10 137/315.07 |
| 8,113,242 B1 | 2/2012 | Bennett | | |
| 8,631,829 B1 ‡ | 1/2014 | Bennett | ............... | B29C 66/73921 138/10 |
| 9,546,747 B2 | 1/2017 | Hofmann | | |
| 9,746,391 B2 ‡ | 8/2017 | Gagne | ............... | G01N 27/10 |
| 2004/0232923 A1* | 11/2004 | Farruggia | ............... | G01N 33/18 324/694 |
| 2005/0035317 A1 ‡ | 2/2005 | Welch | ............... | F16K 7/04 251/4 |
| 2006/0048818 A1 ‡ | 3/2006 | Welch | ............... | F16L 55/10 137/26 |
| 2008/0169037 A1 ‡ | 7/2008 | Ziegler | ............... | F16L 39/005 138/149 |
| 2008/0277015 A1 ‡ | 11/2008 | Tanaka | ............... | F16L 25/0045 138/11 |
| 2009/0078905 A1 ‡ | 3/2009 | Marcilese | ............... | F16K 27/0236 251/366 |
| 2009/0260705 A1 ‡ | 10/2009 | Ainsworth | ............... | F16L 57/00 138/11 |
| 2012/0018654 A1 ‡ | 1/2012 | Wennberg | ............... | F16K 31/1262 251/9 |
| 2012/0279594 A1 ‡ | 11/2012 | Gagne | ............... | F16K 3/30 137/60 |
| 2013/0080081 A1* | 3/2013 | Dugger | ............... | G16Z 99/00 73/861.25 |
| 2013/0171265 A1* | 7/2013 | Saxena | ............... | A61Q 19/00 524/588 |
| 2013/0213140 A1* | 8/2013 | Eichhorn | ............... | A61B 5/6853 977/956 |

FOREIGN PATENT DOCUMENTS

| | | | | |
|---|---|---|---|---|
| CN | 102483167 | | 5/2012 | |
| CN | 102483167 A | ‡ | 5/2012 | ............... F16K 7/06 |
| CN | 103906956 | | 2/2014 | |
| CN | 103906956 A | ‡ | 2/2014 | ............... F16K 7/065 |
| EP | 0707170 | ‡ | 4/1996 | |
| JP | S57146990 A | | 9/1982 | |
| JP | 6254526 B2 | | 4/1987 | |
| JP | 04077094 U | | 7/1992 | |
| JP | 08219355 A | * | 8/1996 | |
| JP | 3135044 U | | 8/2007 | |
| JP | 2013245702 A | | 12/2013 | |
| WO | 2007134416 A2 | | 11/2007 | |
| WO | WO 2014/068696 | | 5/2014 | |
| WO | WO 2014/068696 A1 | ‡ | 5/2014 | ............... F16K 7/065 |
| WO | 2015/066229 | | 5/2015 | |
| WO | WO 2015/066229 | | 5/2015 | |
| WO | WO-2015/066229 | ‡ | 5/2015 | |
| WO | WO 2015/066229 A2 | ‡ | 5/2015 | |
| WO | 2015/109209 | | 7/2015 | |
| WO | WO-2015/109209 | ‡ | 7/2015 | |

OTHER PUBLICATIONS

Response to Third Office Action dated Aug. 28, 2019 together with English translations of claims only in Chinese Application No. 2015800754887, (7pages).‡
Response to Written Opinion dated Aug. 14, 2019 in Singapore Patent Application No. 11201704870V, (10pages).‡
Response to extended European Search Report dated Feb. 11, 2019 for European Patent Application 15870913.1-1010, (13pages).‡
Response to First Office Action dated Jan. 24, 2019, together with English translations of claims only in Chinese Application No. 2015800754887, (12pages).‡
Response to Second Office Action dated May 21, 2019 together with English translations of claims only in Chinese Application No. 2015800754887, (10pages).‡
Notification of the Third Office Action dated Jun. 19, 2019 in Chinese Application No. 2015800754887, (7pages).‡
Invitation to Respond to Written Opinion dated May 31, 2018 in Singapore Patent Application No. 11201704870V (9pages).‡
Extended European Search Report (EESR) for Appln. 15870912.1 dated Jul. 24, 2018 (7 pages).‡
Official Notification dated Mar. 19, 2019 together with the second Written Opinion in Singapore Patent Application No. 11201704870V, (5pages).‡
Notification of the Second Office Action dated Mar. 11, 2019 in Chinese Application No. 2015800754887, (16pages).‡
Response to Written Opinion dated Oct. 16, 2018 in Singapore Application No. 11201704870V, (31pages).‡
Notification of the First Office Action dated Sep. 27, 2018 in Chinese Application No. 2015800754887, (16pages).‡
PCT Written Opinion of the International Search Authority for PCT/US2015/065901, Applicant: Alphinity, LLC, Form PCT/ISA/237, dated Jun. 12, 2017 (7 pages).‡
PCT International Search Report for PCT/US2015/065901, Applicant: Alphinity, LLC, Form PCT/ISA/210 and 220, dated Jun. 12, 2017 (4 pages).‡
PCT International Preliminary Report on Patentability (Chapter I of the Patent Cooperation Treaty) for PCT/US2015/065901, Applicant: Alphinity, LLC, Form PCT/IB/326 and 373, dated Jun. 29, 2017 (9pages).‡
Response to extended European Search Report dated Feb. 11, 2019 for European Patent Application No. 15870913.1-1010, (13pages).
Notice of Rejection dated Jan. 6, 2020 in Japanese Patent Application No. 2017-533477, (12pages).

\* cited by examiner
‡ imported from a related application

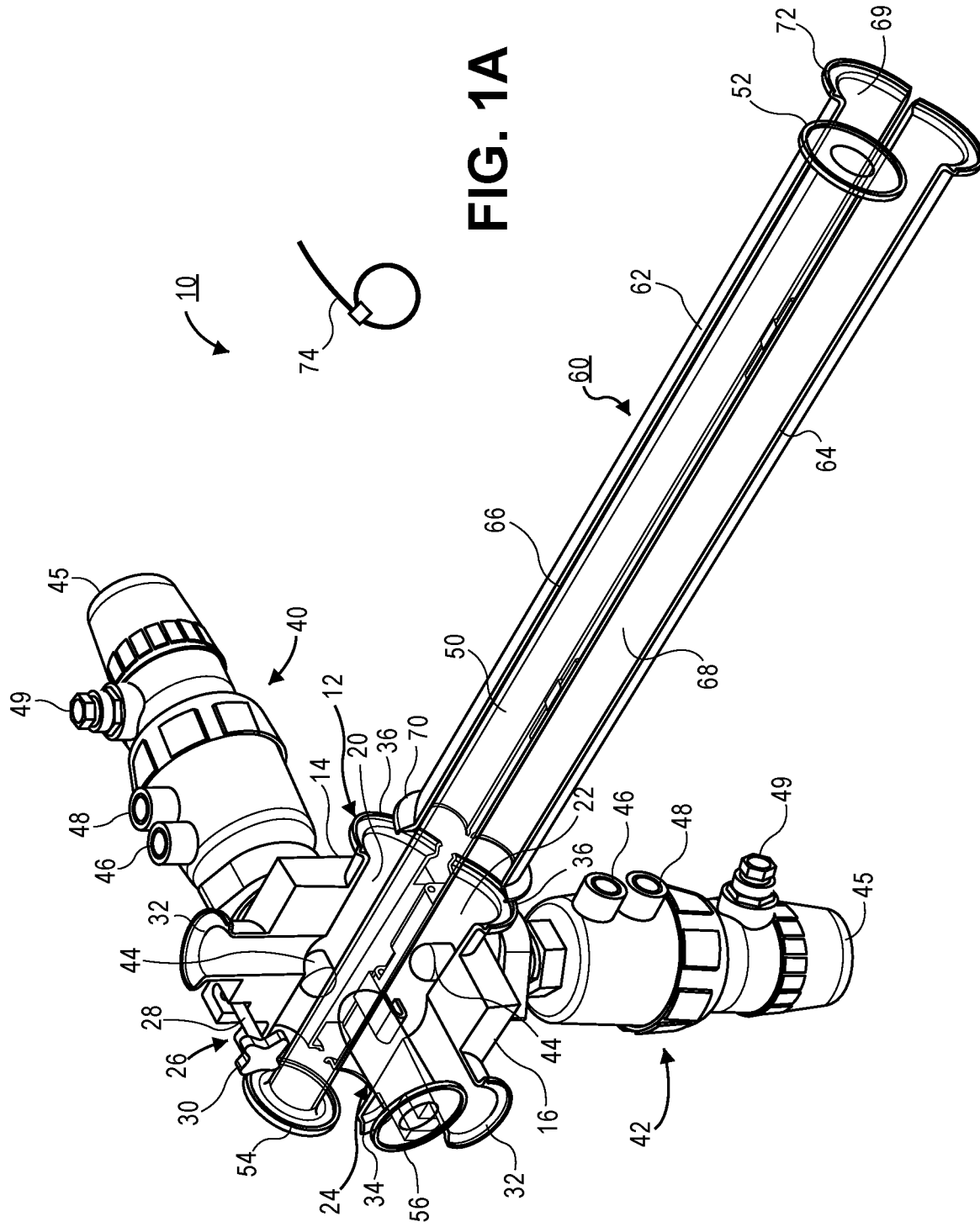

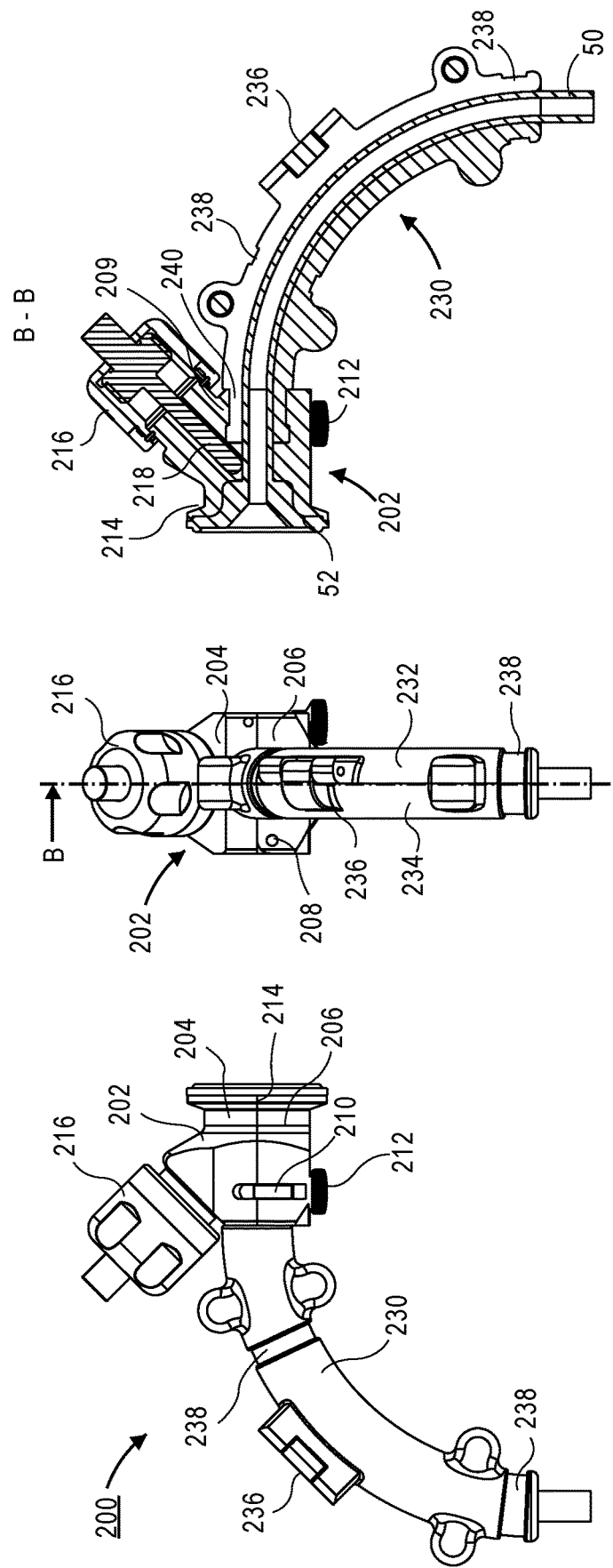

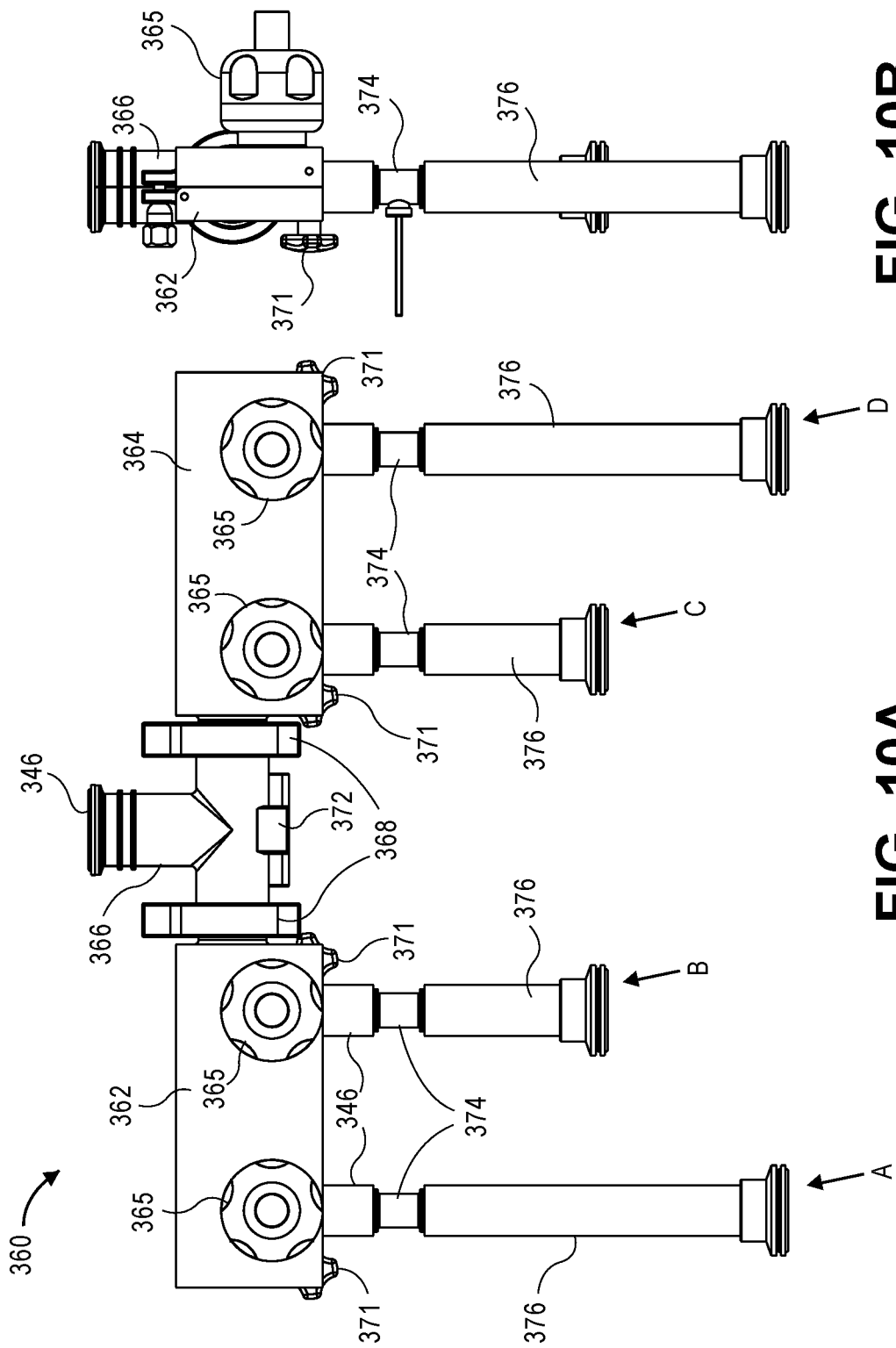

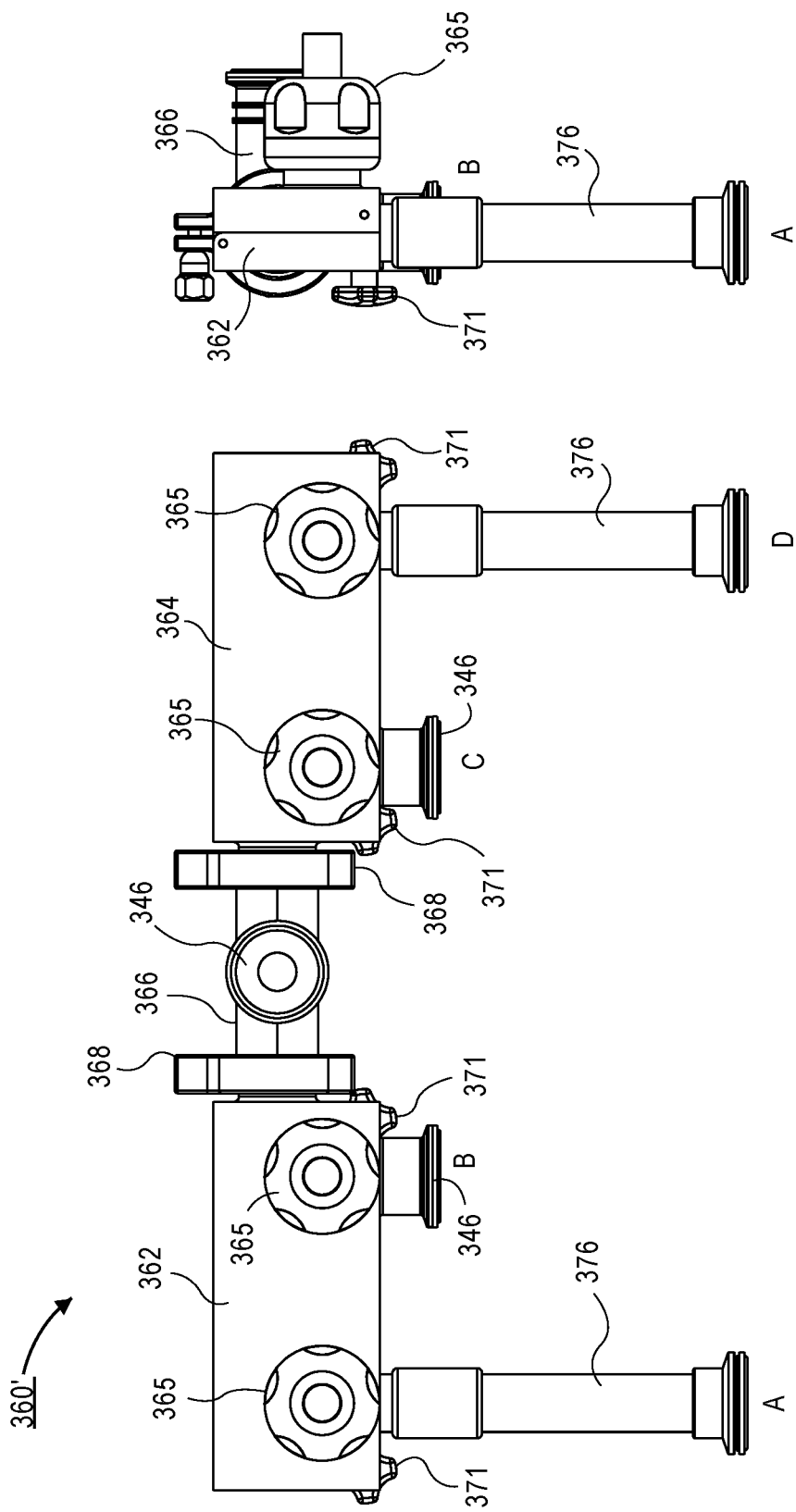

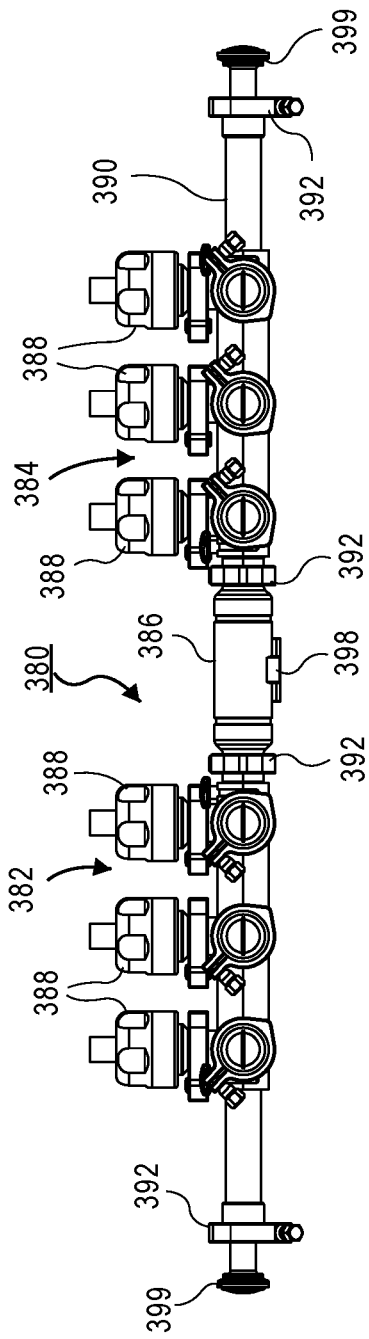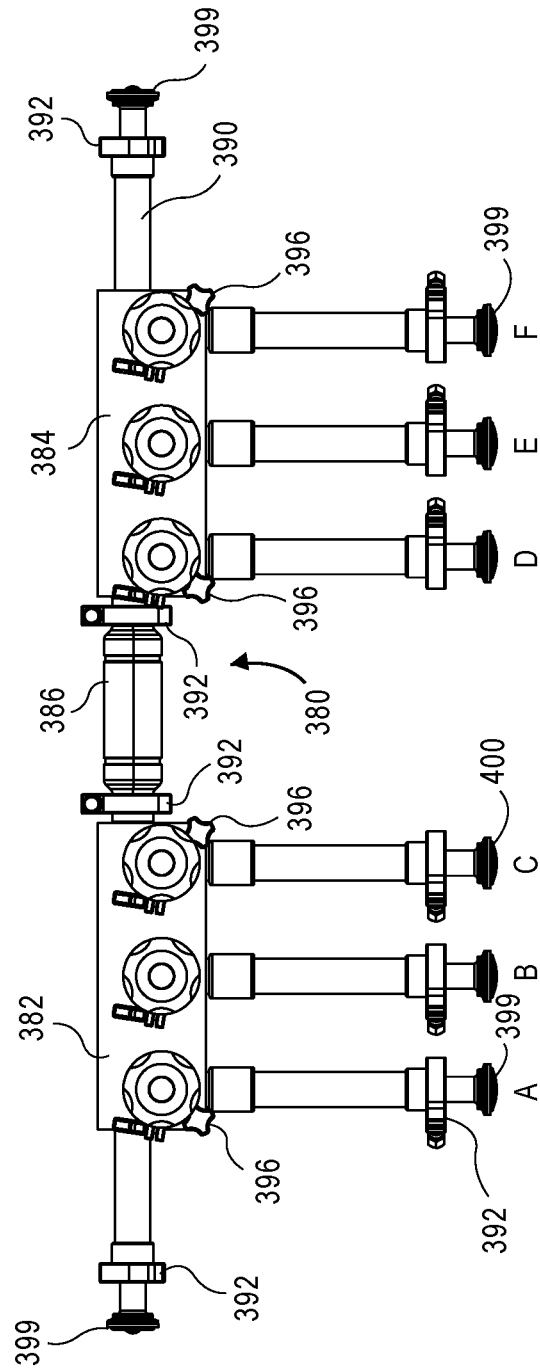

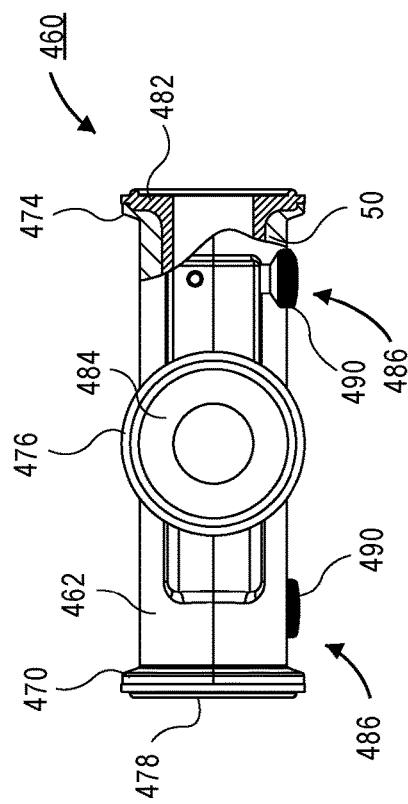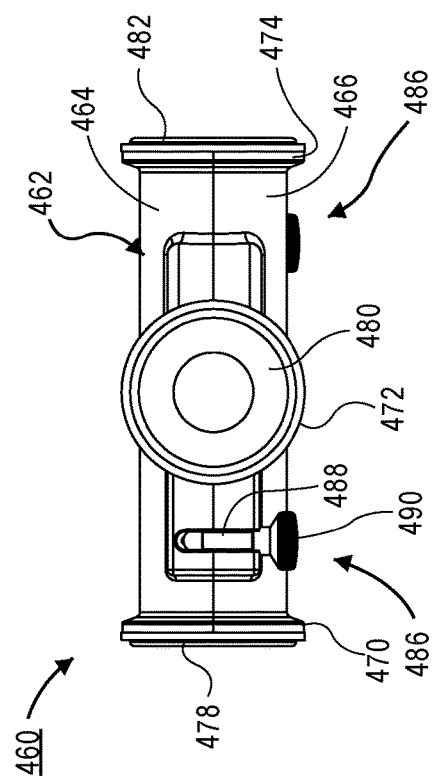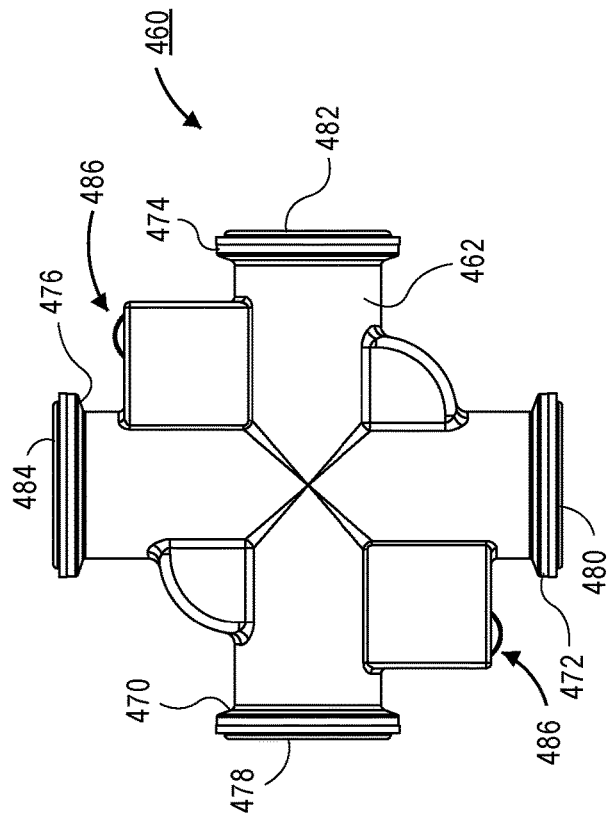

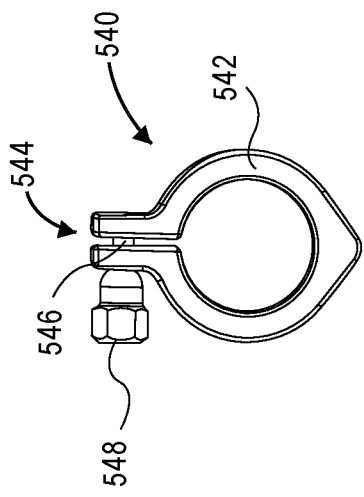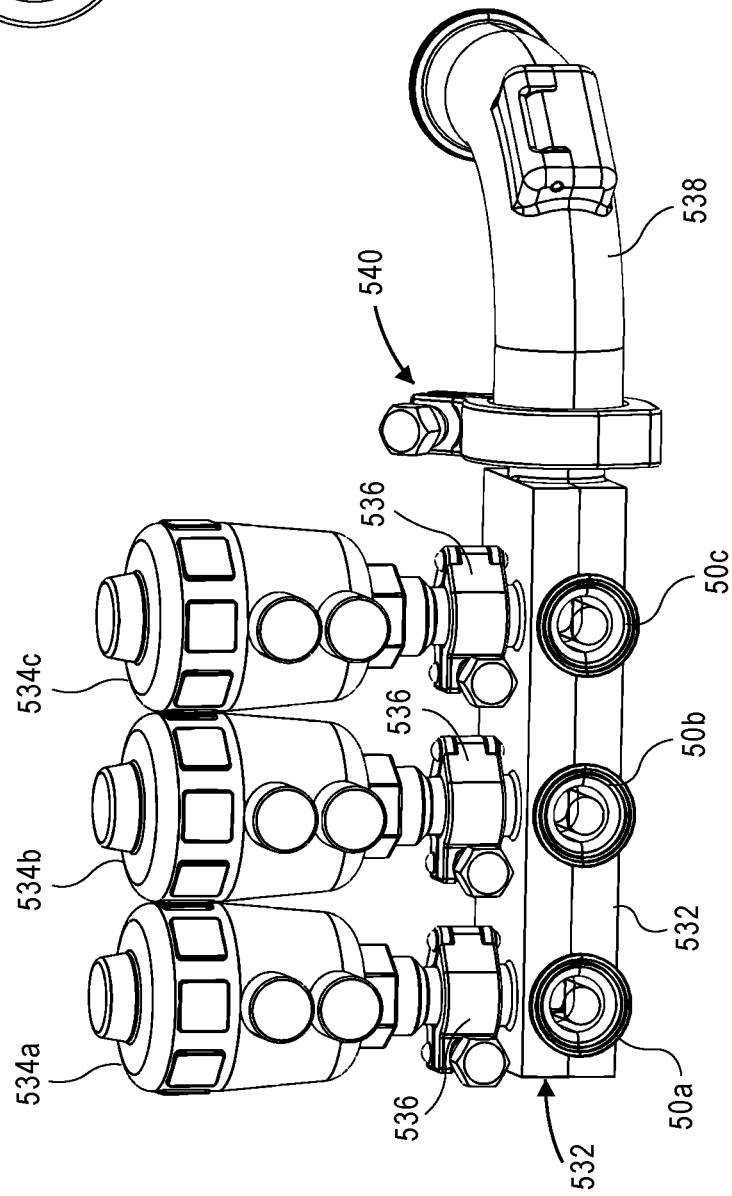

ENCAPSULATED SYSTEM FOR PRESSURIZED FLUID PROCESSES

RELATED APPLICATION

This Application is a continuation of U.S. application Ser. No. 15/535,601 filed on Jun. 13, 2017, now allowed, which U.S. National Stage filing under 35 U.S.C. § 371 of International Application No. PCT/US2015/065901, filed Dec. 15, 2015, which claims priority to U.S. Provisional Patent Application No. 62/094,829 filed on Dec. 19, 2014, which is hereby incorporated by reference in its entirety. The contents of the aforementioned applications are hereby incorporated herein by reference in their entirely. Priority to the above-noted applications is hereby expressly claimed in accordance with 35 U.S.C. §§ 119, 120, 365 and 371 and any other applicable statutes.

FIELD OF THE INVENTION

The field of the invention generally relates to fluid-based systems and processes used in the manufacture, production, or capture of products. More specifically, the invention pertains to fluid-based process systems and components thereof used in connection with pharmaceutical and biological applications or other hygienic process industries.

BACKGROUND OF THE INVENTION

Many commercial products are produced using chemical as well as biological processes. Pharmaceuticals, for example, are produced in commercial quantities using scaled-up reactors and other equipment. So-called biologics are drugs or other compounds that are produced or isolated from living entities such as cells or tissue. Biologics can be composed of proteins, nucleic acids, biomolecules, or complex combinations of these substances. They may even include living entities such as cells. For example, in order to produce biologics on a commercial scale, sophisticated and expensive equipment is needed. In both pharmaceutical and biologics, for example, various processes need to occur before the final product is obtained. In the case of biologics, cells may be grown in a growth chamber or the like and nutrients may need to be carefully modulated into the growth chamber. Waste products produced by cells may also have to be removed on a controlled basis from the fermentation chamber. As another example, biologic products produced by living cells or other organisms may need to be extracted, concentrated, and ultimately collected. The overall manufacturing process may involve a variety of separate but interconnected processes. For example, a biological product of interest may be produced in one part of the system that requires the addition of certain fluids and reagents. The produced product may need to be extracted in one or more downstream processes using and separation techniques.

Because there are a number of individual processes required to produce the final product, various reactants, solutions, and washes are often pumped or otherwise transported to various subsystems using conduits and associated valves. These systems may be quite cumbersome and organizationally complex due to the large numbers of conduits, valves, sensors, and the like that may be needed in such systems. Not only are these systems visually complex (e.g., resembling spaghetti) they also include many components that are required to be sterilized between uses to avoid cross-contamination issues. Indeed, the case of pharmaceutical and biologic drug preparation, the Federal Food and Drug Administration (FDA) is becoming increasingly strict on cleaning, sterilization or bio-burden reduction procedures that are required for drug and pharmaceutical preparations. This is particularly of a concern because many of these products are produced in batches which would require repeated cleaning, sterilization or bio-burden reduction activities on a variety of components.

In many production systems, various subsystems or sub-units are connected together via conduits that carry fluid to and from the various process operations that take place. Quite often, this fluid is under significant pressure. In current systems, various types of tubing are used as conduits to connect various subsystems or units. These include reinforced tubing and unreinforced tubing and tubing made of different materials. There are several drawbacks to using a reinforced conduit such as braided silicone tubing. First, braided silicone tubing cannot be bent with sharp turns or bends. Consequently, braided silicone tubing (or other reinforced conduits) require long radius sections making the conduit sections very long. This causes organizational complexity in the system with long turning sections of conduit being required. Moreover, these long sections of conduit have significant hold-up volumes. In modern pharmaceutical and biological production processes, the quantity of the final product that is produced during a production process is quite small and represents a significant amount of money. Any residual product that is lost within hold-up volumes can represent a very significant financial loss. It is thus imperative to reduce or minimize hold-up volumes in such operations. The problems mentioned above with reinforced tubing are exacerbated even more when larger diameter tubing is being used. As production systems are scaled-up for larger production volumes, larger diameter conduits are increasingly being used with lower pressure ratings or tubing is being used with additional reinforcement (e.g., multi-braided tubing which is stiff and unable to bend into short turns). Another downside to reinforced silicone or other reinforced tubing is the much higher cost as compared to unreinforced tubing. Unreinforced tubing, however, cannot be used in processes conducted at elevated fluid pressures as the conduit will fail.

SUMMARY

In one aspect of the invention, a fluid management system for handling pressurized fluid is disclosed that is able to connect various subsystems or subunits without the need to use reinforced tubing or other reinforced conduit. The fluid management system utilizes one or more segments of unreinforced conduit that are encapsulated at various points (or all points) along a length of the segment with one or more rigid encapsulating members. The unreinforced conduit may be made from a material that is compatible with pharmaceutical and biological processes such as, for example, silicone. The unreinforced conduit may be made a disposable element while the rigid encapsulating members may be re-used.

In one aspect, the encapsulating member may include a two-part valve body or valve that surrounds and encapsulates a portion of the unreinforced conduit. In another aspect, the encapsulating member may include a two-part jacket that surrounds and encapsulates a portion of the unreinforced conduit. In one advantageous aspect of the invention, substantially all of the length of the unreinforced conduit is encapsulated by one or more rigid encapsulating members. For example, a length of unreinforced conduit may be encapsulated by a two-part valve body in addition to a being encapsulated by one or more two-part jacket members. In some embodiments, the rigid encapsulating members are constructed to be interlocking with one another. The rigid encapsulating members may interlock with one another using male and female ends the fit together. Alternatively, the rigid encapsulating members may be secured to one another using mating flanges along with a clamp secured about the periphery of the mating flanges.

As an example, a jacket member may interlock with the two-part valve body. In still another option, different jacket members may interlock with one another. Likewise, the two-part valve body and the jacket members may interlock with various processing subunits or subsystems that are part of the fluid management system. For example, various inlets and outlets may interface with ends of the jacket members. As an alternative to an interlocking arrangement, in another aspect, adjacent encapsulating members may merely abut one another. This particular alternative embodiment may be used when relatively low fluid pressures are used. At higher fluid pressures, it is preferably to have a stronger interlocking arrangement between adjacent encapsulating members. The encapsulating members may incorporate additional functionality in certain embodiments. For example, sensors may be incorporated into the two-part valve body or the jacket member.

In another embodiment, a fluid management system for handling pressurized fluid within a fluidized process includes a two-part jacket that has a first half and a second half joined together via a hinge, the first half defining a semi-circular inner surface, the second half defining a semi-circular inner surface, the first half and the second half configured to mate with each other to define a circular passageway through the two-part jacket. The system includes an unreinforced polymer conduit having a lumen therein dimensioned to carry the pressurized fluid, the unreinforced polymer conduit disposed within the circular passageway, wherein the unreinforced polymer conduit fits snugly within the circular passageway. The system includes at least one fastener disposed on at least one of the first half or the second half of the two-part jacket, the at least one fastener configured to hold the first half and the second half securely about the unreinforced polymer conduit.

In another embodiment, a fluid management system for handling pressurized fluid within a fluidized process includes a segment of unreinforced polymer conduit having a lumen therein dimensioned to carry the pressurized fluid therein. The system includes a two-part valve body encapsulating a portion of the segment of unreinforced polymer conduit, the two-part valve body having a first half and a second half connected to one another via a hinge and having a fastener configured to secure the first and second halves in a closed state around the segment of unreinforced polymer conduit, the two-part valve body has a moveable actuator (which may be manually activated or automatically activated) disposed in one of the first half or the second half and configured to selectively engage with the segment of unreinforced polymer conduit and adjust a size of the lumen of the unreinforced polymer conduit (the size of the lumen may be adjusted from anywhere between 0% (i.e., closed) to 100% (fully open)). The system further includes at least one two-part jacket encapsulating a remaining portion of the segment of unreinforced polymer conduit, the at least one two-part jacket comprising a first half and a second half joined together via a hinge, the first half and the second half defining respective inner surfaces configured to mate with each other to define a passageway through the at least one two-part jacket and containing the remaining portion of the segment of unreinforced polymer conduit.

In another embodiment, a fluid management system for handling pressurized fluid within a fluidized process includes a two-part valve body that includes a first half defining a semi-circular inner surface and a second half defining a semi-circular inner surface, the first half and the second half connected via a hinge and configured to mate with each other in a closed configuration to define a circular passageway extending through the two-part valve body, the two-part valve body having a fastener disposed thereon for securing the first half and the second half of the two-part valve body to one another. The system further includes a two-part jacket comprising a first half defining a semi-circular inner surface and a second half defining a semi-circular inner surface, the first half and the second half connected via a hinge and configured to mate with each other in a closed configuration to define a circular passageway extending through the two-part jacket, wherein at least one end of the two-part jacket terminates in a male end dimensioned to fit within inner recesses or grooves formed in the first half and second half of the two-part valve body. An unreinforced polymer conduit is snugly disposed within the circular passageways of the two-part jacket and the two-part valve body.

BRIEF DESCRIPTION OF THE DRAWINGS

FIG. 1A illustrates one embodiment of a fluid management system. A two-part valve body is illustrated with a two-part jacket that interfaces with the two-part valve body. A common segment of unreinforced polymer conduit is disposed within passageways formed within the body and the jacket.

FIG. 6A illustrates a side view of a fluid management system according to another embodiment.

FIG. 6B illustrates a top view of a fluid management system of FIG. 6A.

FIG. 6C illustrates a cross-sectional view of a fluid management system of FIG. 6B taken along the line B-B.

FIG. 10A illustrates a top view of another embodiment of a fluid management system.

FIG. 10B illustrates an end view of another embodiment of the fluid management system of FIG. 10A.

FIG. 11A illustrates a top view of another embodiment of a fluid management system.

FIG. 11B illustrates an end view of another embodiment of the fluid management system of FIG. 11A.

FIG. 12A illustrates a side view of another embodiment of a fluid management system.

FIG. 12B illustrates a top view of another embodiment of the fluid management system of FIG. 12A.

FIG. 15A illustrates a top view of a fluid management system according to one embodiment.

FIG. 15B illustrates a side view of the fluid management system of FIG. 15A.

FIG. 15C illustrates a partially cut-away end view of the fluid management system of FIG. 15A.

FIG. 16C illustrates another embodiment of a fluid management system that includes a two-part valve body (holding multiple valves) that is secured to a two-part jacket using a clamp.

FIG. 16D illustrates an end view of the clamp illustrated in FIG. 16C.

DETAILED DESCRIPTION OF THE ILLUSTRATED EMBODIMENTS

Figure 1B:
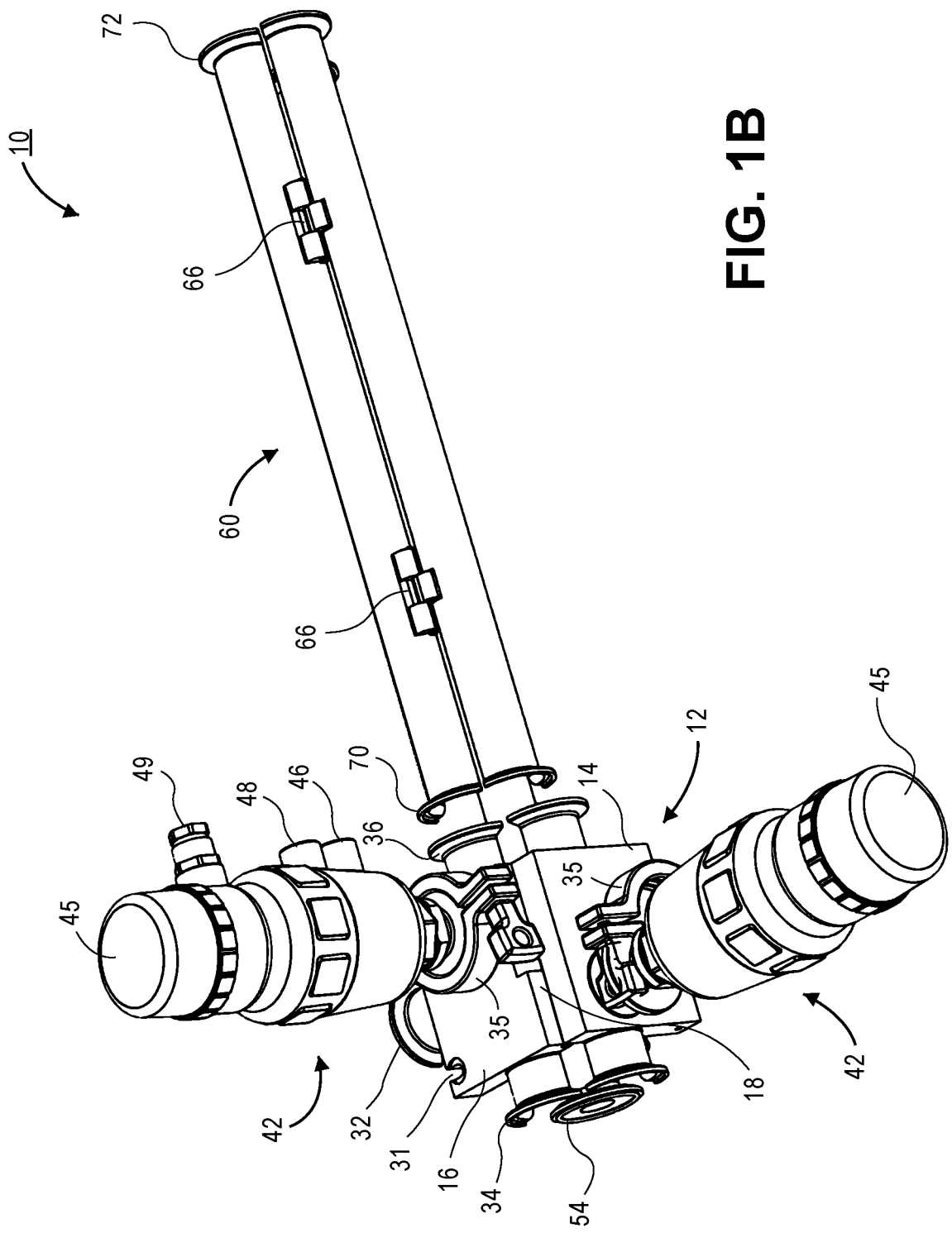
FIG. 1B illustrates another view of the fluid management system of FIG. 1A.

FIGS. 1A and 1B illustrate one embodiment of a fluid management system 10 according to one embodiment. In this embodiment, the fluid management system 10 includes a two-part valve body 12 (illustrated in the open configuration in FIGS. 1A and 1B) that includes a first half 14 and a second half 16 that is connected via a hinge 18 (as seen in FIG. 1B). Each of the first half 14 and the second half 16 of the valve body 12 includes respective semi-circular shaped inner surfaces 20, 22 that defines a passageway 24 through the valve body 12 when the valve body is in the closed state. While the inner surfaces 20, 22 are described as being semi-circular shaped, the surfaces 20, 22 may have different shapes. The key is that the shape(s) of the inner surfaces 20, 22 matches the exterior shape of the flexible conduit or tubing that is contained therein (described below). In this particular example, the semi-circular shaped inner surfaces 20, 22 define a tee-shaped passageway 24 although different shaped passageways are contemplated. For example, the passageway 24 may be straight, curved, branched (e.g., cross), or the like. The passageway 24 may be in a single plane or even multiple planes.

Still referring to FIG. 1A, the valve body 12 includes a fastener 26 that is used to maintain the valve body 12 in a closed state and can be used to selectively open (or close) the valve body 12 as needed. In this example, the fastener 26 includes a threaded latch 28 element and knob 30 that can be used to tighten or loosen the latch 28 in place. The threaded latch 28 is mounted via a pivot to the first half 14 of the valve body 12 and includes a threaded shaft on which is mounted the knob 30. To close and lock the valve body 12, the threaded latch 28 is pivoted into a notch 31 formed on the second half 16 of the valve body 12 and the knob 30 is tightened against the second half 16 which secures the valve body 12 in the closed state. To open the valve body 12, the knob 30 is turned in the opposite direction and threaded latch 28 is pivoted to allow the first and second halves 14, 16 to open.

The valve body 12 may be made from a number of materials. For example, the valve body 12 may be made of a metal such as, for example, stainless steel although other metals and alloys thereof may also be used. Alternatively, the valve body 12 may be made from a polymer material such as acrylonitrile butadiene styrene (ABS) or other engineered thermoplastic materials suitable for the environment or application. Examples include polyetherimide (PEI), aliphatic polyamides (e.g., Nylon), polyphenylsulfone (e.g., RADEL), etc.

As seen in FIGS. 1A and 1B, the valve body 12 has terminating flanges 32, 34, 36 in which each half of the respective flange is formed in respective halves 14, 16 of the valve body 12. The flanges 32, 34, 36 are fully formed when the valve body 12 is in the closed state. The flanges 32, 34, 36 are used to mate with corresponding flanges of a connecting component, device, piece, element (e.g., two-part jacket and the like), and the like. A clamp 35 such as that illustrated in FIG. 1B or 16D is positioned about the mating flanges and is tightened to make a secure attachment between adjacent components. In some alternative embodiments, however, the valve body 12 may omit the terminating flanges 32, 34, 36. For example, components may interface with the valve body 12 by being secured to an interior recessed surface of the valve body 12.

In the embodiment of FIGS. 1A and 1B, the valve body 12 is illustrated with two valves 40, 42 that are mounted on the valve body 12. Each valve 40, 42 includes an actuator element 44 that passes through an opening in the respective valve body half 14, 16 and is selectively actuated to "pinch" an unreinforced polymer conduit 50 that is disposed inside the passageway 24 of the valve body 12. The valves 40, 42 may be any number of types of valves commonly known to those skilled in the art. For example, the valves 40, 42 may be manual valves whereby a bonnet or the like is rotated manually to advance/retract the actuator 44. Alternatively, the valves 40, 42 may be automatically actuated valves such as those illustrated in FIGS. 1A and 1B. The valves 40, 42 illustrated in FIGS. 1A and 1B are pneumatically actuated valves using air ports 46, 48. The valves 40, 42 illustrated in FIGS. 1A and 1B also include an optional position feedback indication switch 45 that indicate the position of the valve 40, 42 (e.g., open or closed). The optional position feedback indication switch 45 may include a port 49 for electrical cabling. While the valves 40, 42 illustrated in FIGS. 1A and 1B are pneumatically actuated, other actuation modalities may be employed. For example, the valves 40, 42 may be servo-actuated, motor-activated, hydraulically-actuated, and the like.

Still referring to FIGS. 1A and 1B, this embodiment of the fluid management system 10 includes a two-part jacket 60 that includes a first half 62 and a second half 64. The two-part jacket 60 is preferably made of a rigid construction using, for example, a polymer based material. Materials include standard thermoplastics and polyolefins such as polyethylene (PE) and polypropylene (PP) or a hard plastic such as polyetherimide (PEI) such as ULTEM resins. The two-part jacket 60 may also be formed from fluoropolymers such as polyvinylidene fluoride (PVDF) or perfluoroalkoxy (PFA), polytetrafluoroethylene (PTFE), polycarbonate (which may be more thermally resistant), polysulfone (PSU), and the like. In the embodiment of FIGS. 1A and 1B, the two halves 62, 64 of the jacket 60 are connected via one or more hinges 66 (two such hinges 66 are seen in FIG. 1B) that allow the jacket 60 to be opened and closed as needed. The two-part jacket 60 defines an exoskeleton-type structure that snugly surrounds the unreinforced polymer conduit 50 and prevents the unreinforced polymer conduit 50 from failing (e.g., bursting or forming an aneurysm type bulge in the conduit) under high fluid pressures. Each half 62, 64 of the two-part jacket 60 includes respective semi-circular inner surfaces 66, 68 that form a circularly-shaped pathway 69 when the two-part jacket 60 is in the closed state. As with the valve body 12, the shape of the inner surfaces 66, 68 is dictated by the circumferential shape of the unreinforced polymer conduit 50 (which in some embodiments may be different than circular). In the embodiment of FIGS. 1A and 1B, the ends of the two-part jacket 60 includes flanges 70, 72 that are formed in each half 62, 64. In this embodiment, flange 70 is formed to mate with the flange 36 of the two-part valve body 12. An optional seal such as an o-ring type seal (not shown) may be placed between the flanges 70, 36 to aid in forming a fluid-tight seal. In this configuration, a clamp 35 as seen in FIG. 1B or FIG. 16D (clamp 540) may be positioned about the mated flanges 70, 36 to secure the two-part jacket 60 to the two-part valve body 12. Note that even with the clamp 35 securing the two-part jacket 60 to the two-part valve body 12 there still may be relative rotation between the two components. In this regard, there may be a rotational degree of freedom between the two-part jacket 60 to the two-part valve body 12 even though they are secured to one another.

As explained above, the flanges 70, 72 on the two-part jacket 60 may be optional. In some embodiments, there are no flanges at all and the two-part jacket 60 may be secured to the valve body 12 using another interface modality. For example, the ends of the two-part jacket 60 may be designed with ridges (or grooves) that are configured to mate with corresponding grooves (or ridges) that are directly formed in the first and second halves 14, 16 of the valve body 12. In this particular embodiment, for example, closure of the valve body 12 also secures the valve body 12 to the two-part jacket 60.

Still referring to FIGS. 1A and 1B, the unreinforced polymer conduit 50 is illustrated disposed within the passageway 24 formed in the two-part valve body 12 and the passageway 69 formed in the two-part jacket 60. The unreinforced polymer conduit 50 includes a lumen or passageway that extends along the length of the same and carries the liquid that is contained therein. The unreinforced polymer conduit 50 may be made from any number of polymer materials including but not limited to polymer thermoplastic elastomers (TPE), thermoplastic rubber (TPR), silicone (thermally or UV-cured), or other polymers (this applies to all embodiments). In one aspect of the invention, the outer diameter of the unreinforced polymer conduit 50 (when having a circular cross-sectional shape) is substantially equal to the inner diameters of the passageways 24, 69. In this regard, both the two-part valve body 12 and the two-part jacket 60 snugly encapsulates the unreinforced polymer conduit 50 and provides resistance to expansion or other movement of the unreinforced polymer conduit 50 caused by high fluid (i.e., liquid) pressures containing within the unreinforced polymer conduit 50. As illustrated in FIGS. 1A and 1B, the ends of the unreinforced polymer conduit 50 include respective flanges 52, 54, 56 that are dimensioned to fit and reside within the corresponding flanges 32, 24 of the two-part valve body 12 and the flange 72 of the two-part jacket 60. The flanges 52, 54, 56 may be constructed such that an adjacent flange from another unreinforced polymer conduit 50 (not shown) will mate to form a fluid-tight seal. For example, the flange 52, 54, 56 may contain a male sealing ring or extension that fits within a corresponding female recess of another unreinforced polymer conduit 50 (or vice versa). Again, in some embodiments, there may be no flanges 52, 54, 56 in the unreinforced polymer conduit 50 depending the on interface formed between the valve body 12 and the two-part jacket 60.

The dimensions of the unreinforced polymer conduit 50 may vary. In some embodiments, the inner diameter of the unreinforced polymer conduit 50 may range from ⅛ inch up to 2.5 inches or more. The length of the unreinforced polymer conduit 50 may vary as well. In the illustrated system 12 of FIG. 1, substantially the entirety of the unreinforced polymer conduit 50 is covered by the two-part valve body 12 and the two-part jacket 60. The fluid management system 20 can handle significant fluid pressures by using the encapsulated construction. For example, the fluid management system 20 can withstand pressures exceeding 100 psi in some applications without damage or failure. While the embodiments herein have been described largely in the context of using an unreinforced polymer conduit 50, it may also be possible to incorporate reinforcement or reinforcement aspects into the polymer conduit for even more added robustness.

Note that the fluid management systems as contemplated herein may take any number of forms and configurations. For example, the fluid management systems may include multiple valve bodies 12 and multiple two-part jackets 60 that are integrated into the overall system. The fluid management systems may incorporate other components within the same that are not valves. For example, this includes pumps, sensors, separation devices, reagent holders, containers, and the like. The actual construction of the fluid management system is dictated by the purpose and particular application. Regardless of the form, in one particular system configuration, there is at least one valve body 12 contained within the flow path as well as at least one two-part jacket 60. In other embodiments, however, there may be no valves at all.

As seen in FIG. 1A, one or more fasteners 74 may be disposed on the two-part jacket 60 to maintain the same in a closed state. The fastener 74 may include a flex tie such as that illustrated in FIG. 1A or it may include a latch 28 and knob 30 mechanism such as that used in connection with the two-part valve body 12. The fastener 74 may also include screws, bolts, or even a friction fit between the two halves 62, 64. If flex ties are used, the outer periphery of the two-part jacket 60 may have recesses formed therein to receive the flex ties so that the same remain in a fixed location and do not slide along the length of the two-part jacket 60.

Figure 2A:
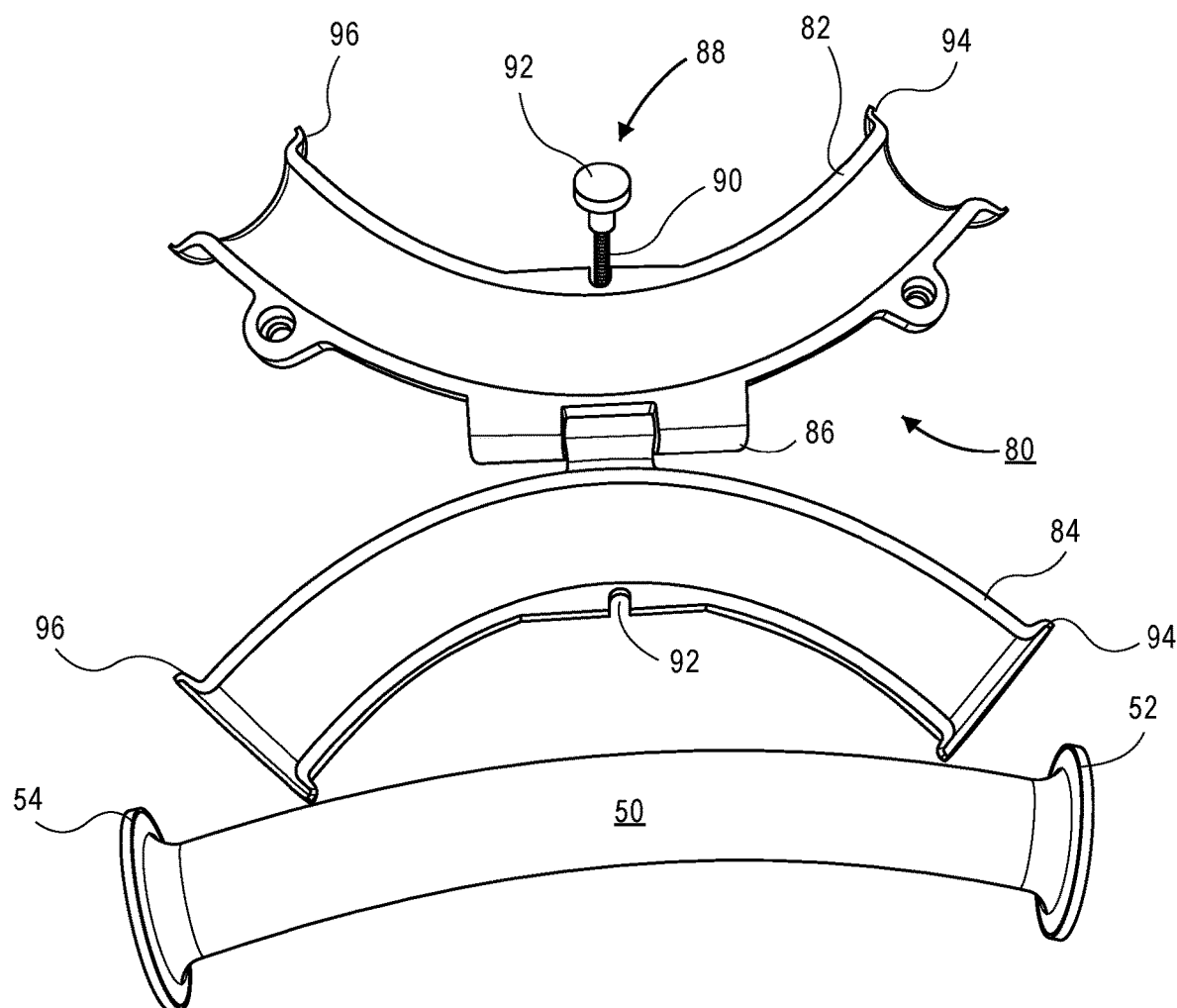
FIG. 2A illustrates an embodiment of a two-part jacket in the form of an elbow. Also illustrated is a segment of unreinforced polymer conduit that is disposed within the two-part jacket.

FIG. 2A illustrates an embodiment of another two-part jacket 80 with an associated unreinforced polymer conduit 50 that is dimensioned to be placed inside. The two-part jacket 80 includes a first half 82 and a second half 84 that are connected to one another via a hinge 86. The hinge 86 is held together via a metallic pin (not shown) that secures the first half 82 to the second half 84. In this embodiment, a fastener 88 that uses a threaded latch 90 and knob 92 is used secure the first half 82 to the second half 84. Like the prior embodiment, the threaded latch 90 is pivotable about an end that is secured to the first half 82. The second half 84 includes a slot or notch 92 dimensioned to receive the threaded latch 90. Tightening of the knob 92 will secure the first and second halves 82, 84 together. In this embodiment, both ends of the two-part jacket 80 include optional flanges 94, 96 similar to those previously described. FIG. 2A also illustrates the unreinforced polymer conduit 50 that can be placed inside the two-part jacket 80. The unreinforced polymer conduit 50 includes optional end flanges 52, 54. Note how the two-part jacket 80 in this embodiment curves and provides a curved pathway for the unreinforced polymer conduit 50. In this embodiment, the curved shape is an arc but the curved shape can include other shapes such as, for example, a "s" shaped turn. The shape can include shape that does not have sharp corners or bends that would cause the unreinforced polymer conduit 50 to close the internal flow path (e.g., pinching or kinking of flow path due to excessive bending). Unlike with reinforced silicone tubing, short segments of unreinforced polymer conduit 50 can be used with smaller curvature radii with no threat of kinking the conduit.

Figure 2C:
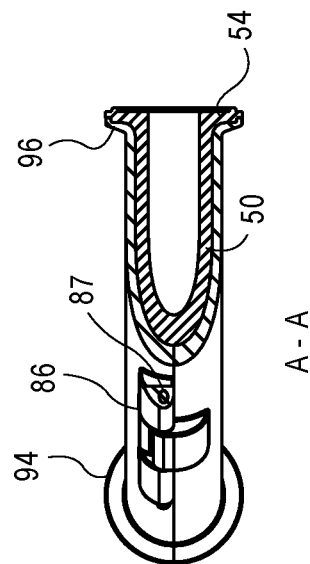
FIGS. 2B-2E illustrate another version of the two-part jacket in the form of an elbow.
Figure 2E:
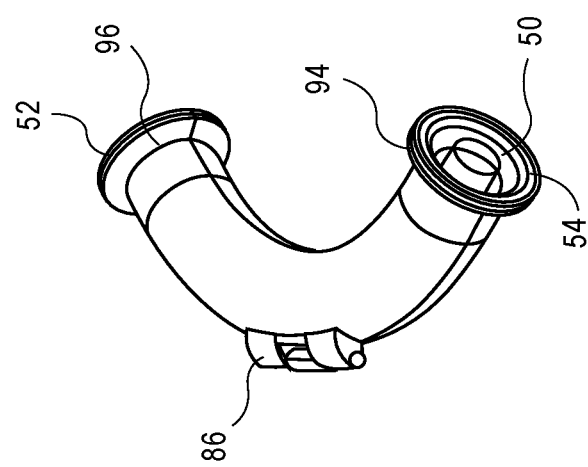
Figure 2B:
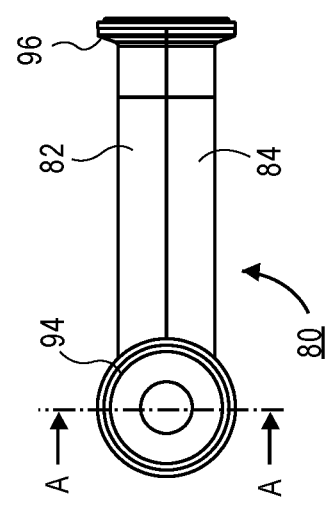
Figure 2D:
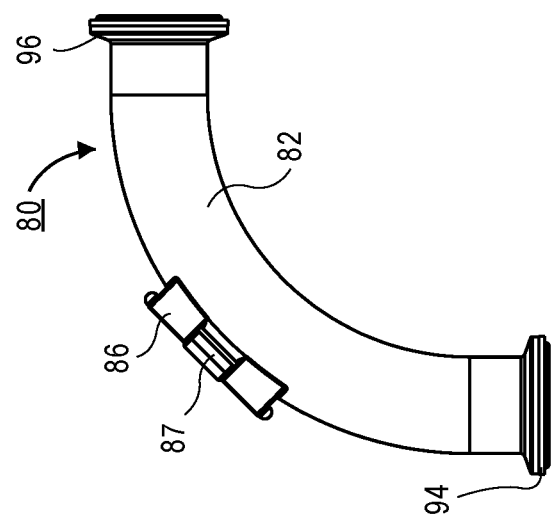
Figure 2H:
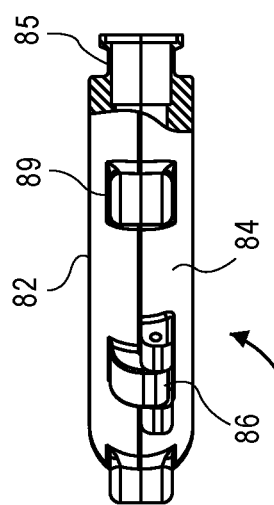
FIGS. 2F-2J illustrate still another embodiment of two-part jacket with a curved configuration.

FIGS. 2B-2E illustrates another embodiment of two-part jacket 80 with a curved configuration. The two-part jacket 80 includes a first half 82 and a second half 84 that are connected to one another via a hinge 86. The hinge 86 is held together via a metallic pin 87 (FIGS. 2C and 2D). Both ends of the two-part jacket 80 include flanges 94, 96 similar to those previously described although these are optional as explained herein. FIG. 2C also illustrates the unreinforced polymer conduit 50 that can be placed inside the two-part jacket 80. The unreinforced polymer conduit 50 includes end flanges 52, 54. In this embodiment, the two-part jacket 80 may be held in the closed state using, for example, fasteners 74 like those illustrated in FIG. 1A. The two-part jacket 80 may also be held together using a frictional engagement between the first half 82 and a second half 84. For example, one of the halves (e.g., 82) may contain a recess or the like while the other half (e.g., 84—or vice versa) contains a protuberance or the like that fits in the recess to form a locking arrangement.

Figure 2J:
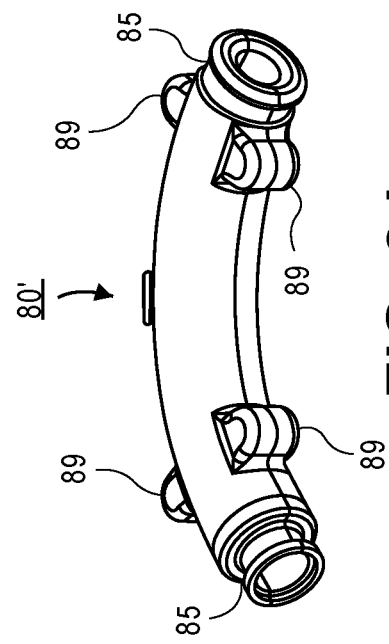
Figure 2I:
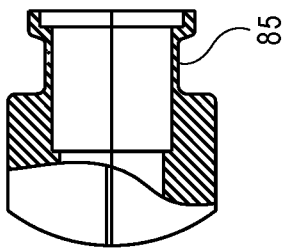
Figure 2F:
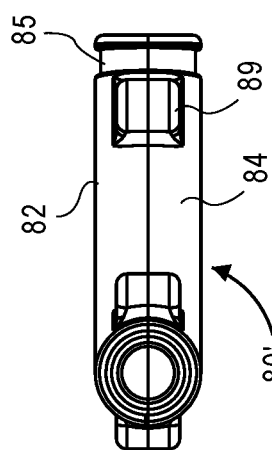
Figure 2G:
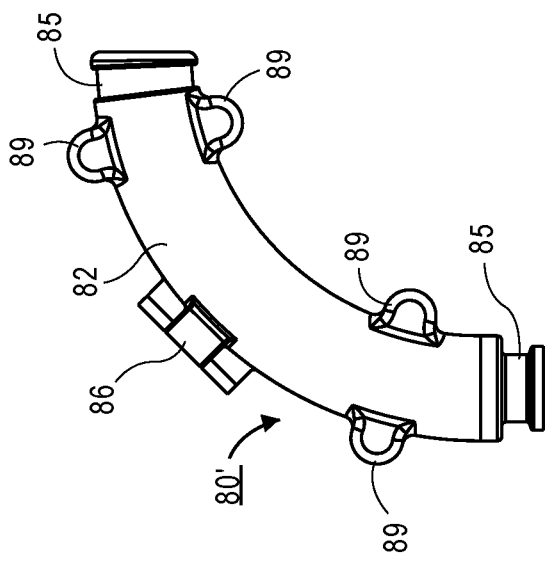
Figure 5:
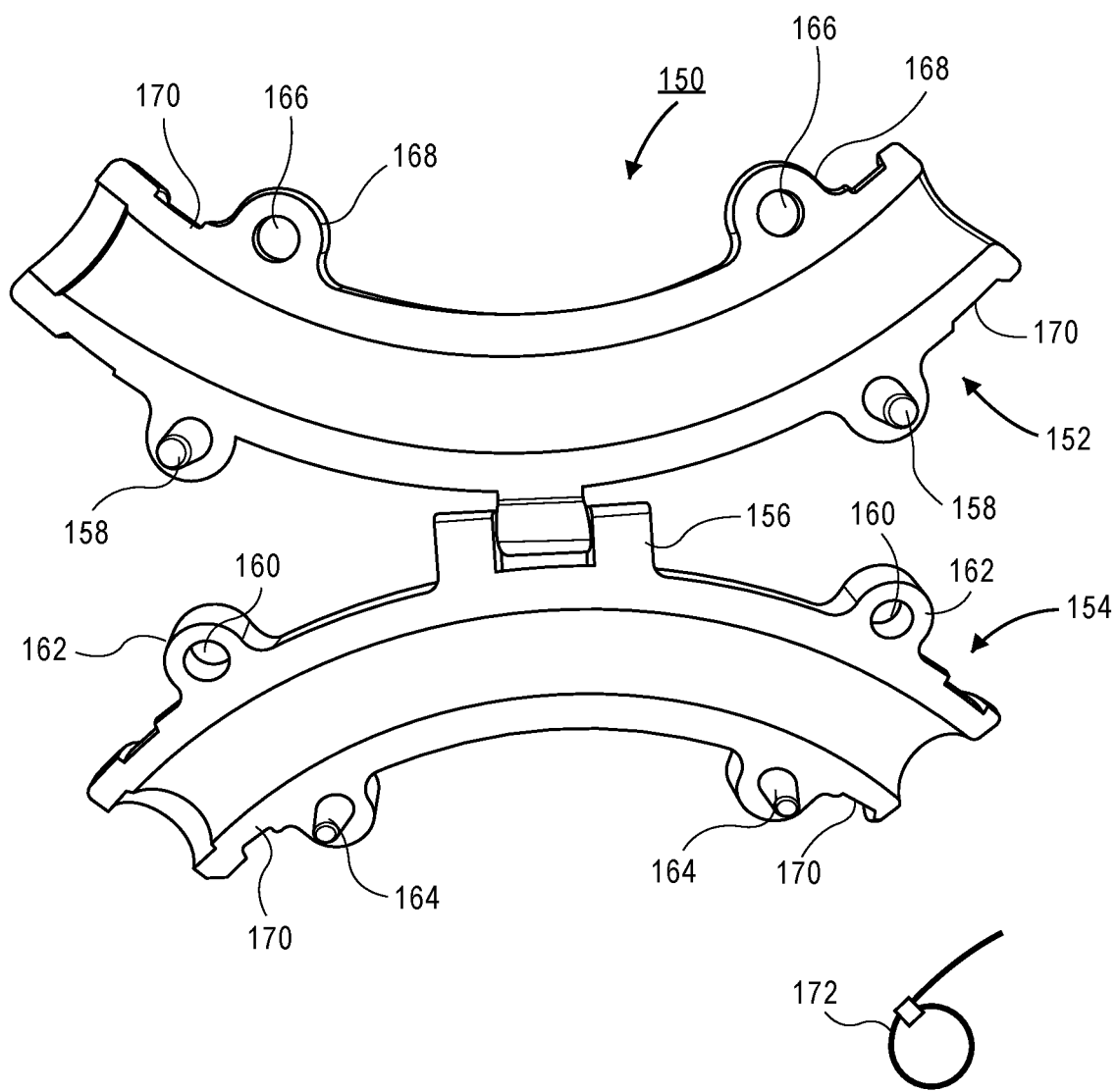
FIG. 5 illustrates another embodiment of a fluid management system. In this embodiment, each half of the two-part jacket is secured to one another view a friction fit. Male projections insert into female apertures and maintain the two-part jacket in the closed configuration. Optional ties or other fasteners may also be used.

FIGS. 2F-2J illustrate still another embodiment of two-part jacket 80' with a curved configuration. The two-part jacket 80' includes a first half 82 and a second half 84 that are connected to one another via a hinge 86. In this alternative embodiment, the ends of the two-part jacket 80' do not have large flange structures. Rather, the two-part jacket 80' includes recesses 85 formed in the ends about the periphery or exterior surface of the halves 82, 84 that are dimensioned to receive a fastener 74 such as flexible tie (e.g., zip tie) as described herein (FIG. 1A). As an alternative to or in conjunction with, the two-part jacket 80' may be held together with a friction fit using a recess/protuberance as described above. For example, FIG. 2J illustrates four different locking elements 89 that whereby a male protuberance or projection located on one half 82, 84 is dimensioned to frictionally engage with corresponding aperture or recess located in the other half 82, 84. The locking elements may include the posts 158 that fit within corresponding apertures 160 located in bosses 162 as seen in FIG. 5.

Figure 3A:
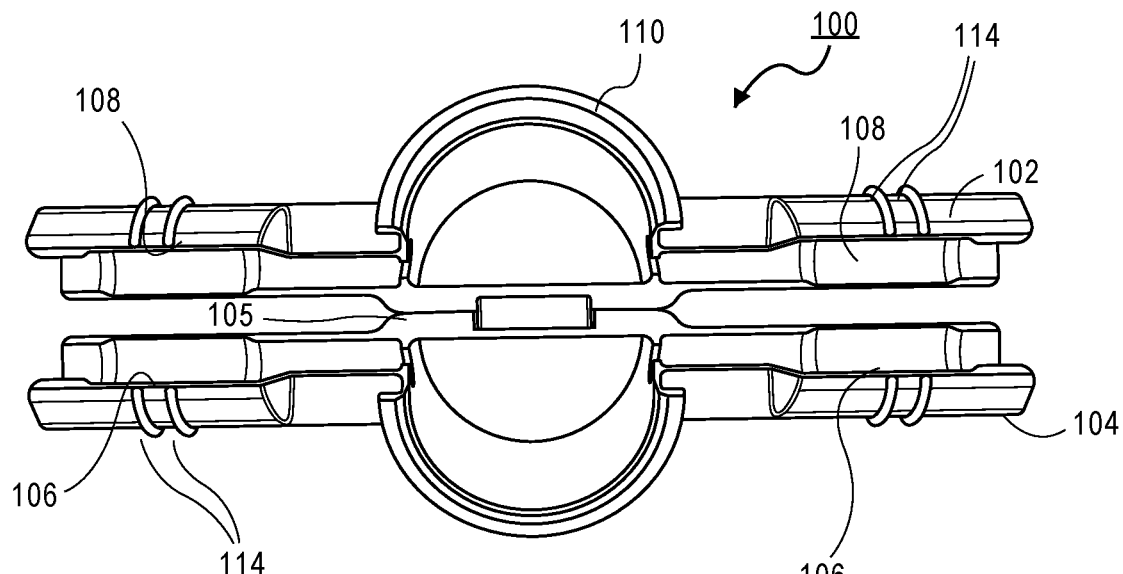
FIG. 3A illustrates an embodiment of a two-part jacket according to another embodiment.
Figure 3B:
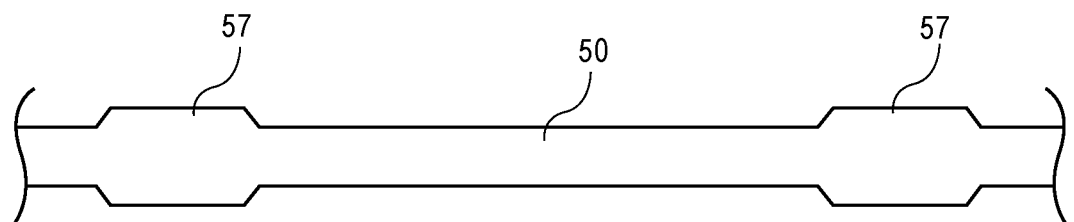
FIG. 3B illustrates a view of a segment of unreinforced polymer conduit that is disposed within the two-part jacket of FIG. 3A.
Figure 3C:
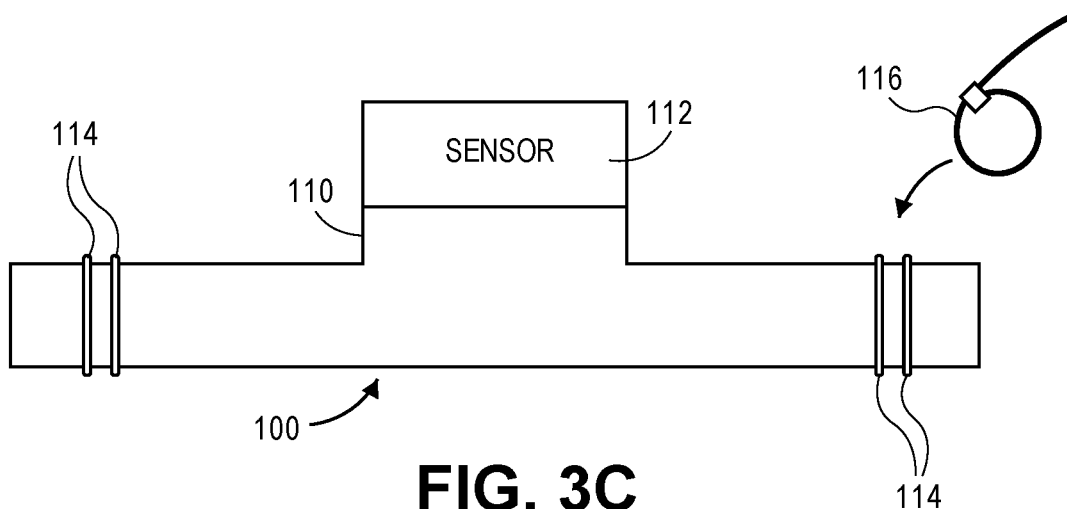
FIG. 3C illustrates a side view of the embodiment of FIG. 3A with an attached sensor.
Figure 3E:
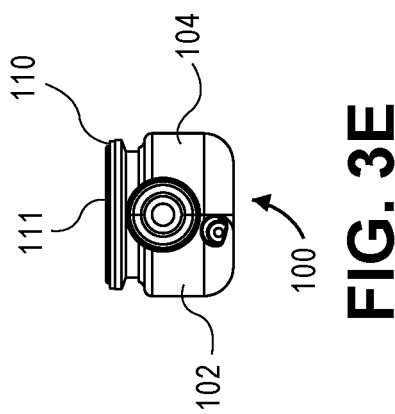
FIGS. 3D-3G illustrate additional views of an embodiment of the type illustrated in FIGS. 3A-3C.
Figure 3D:
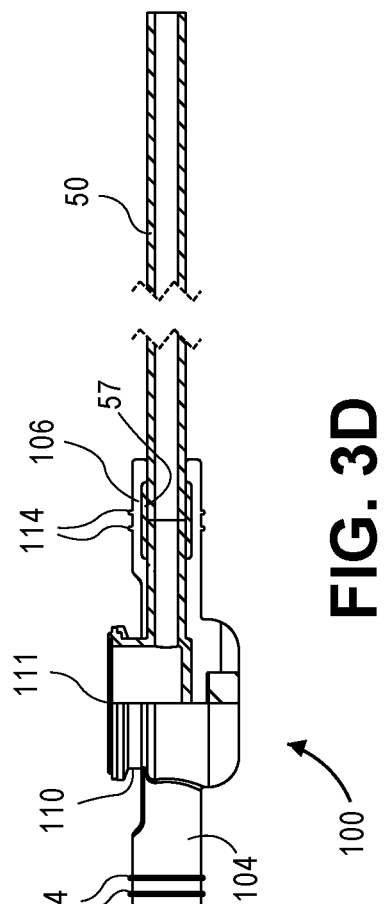
Figure 3F:
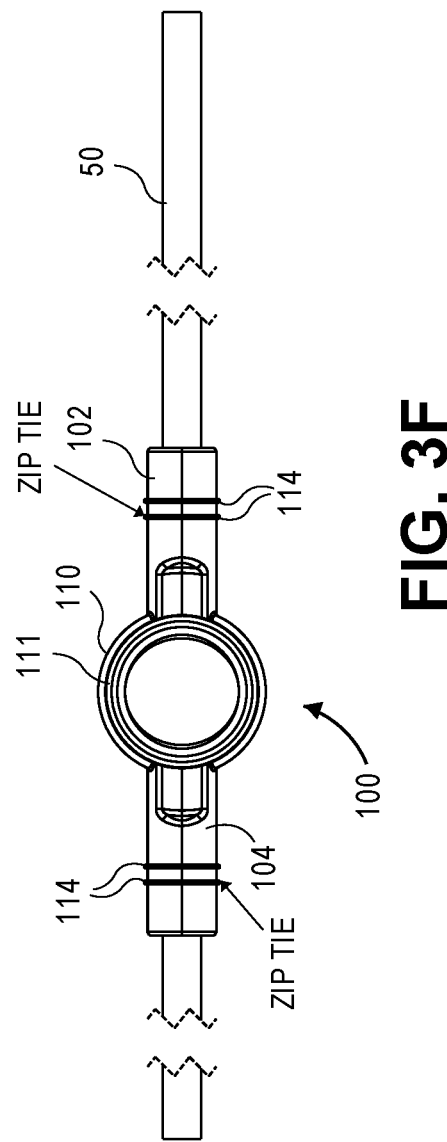
Figure 3G:
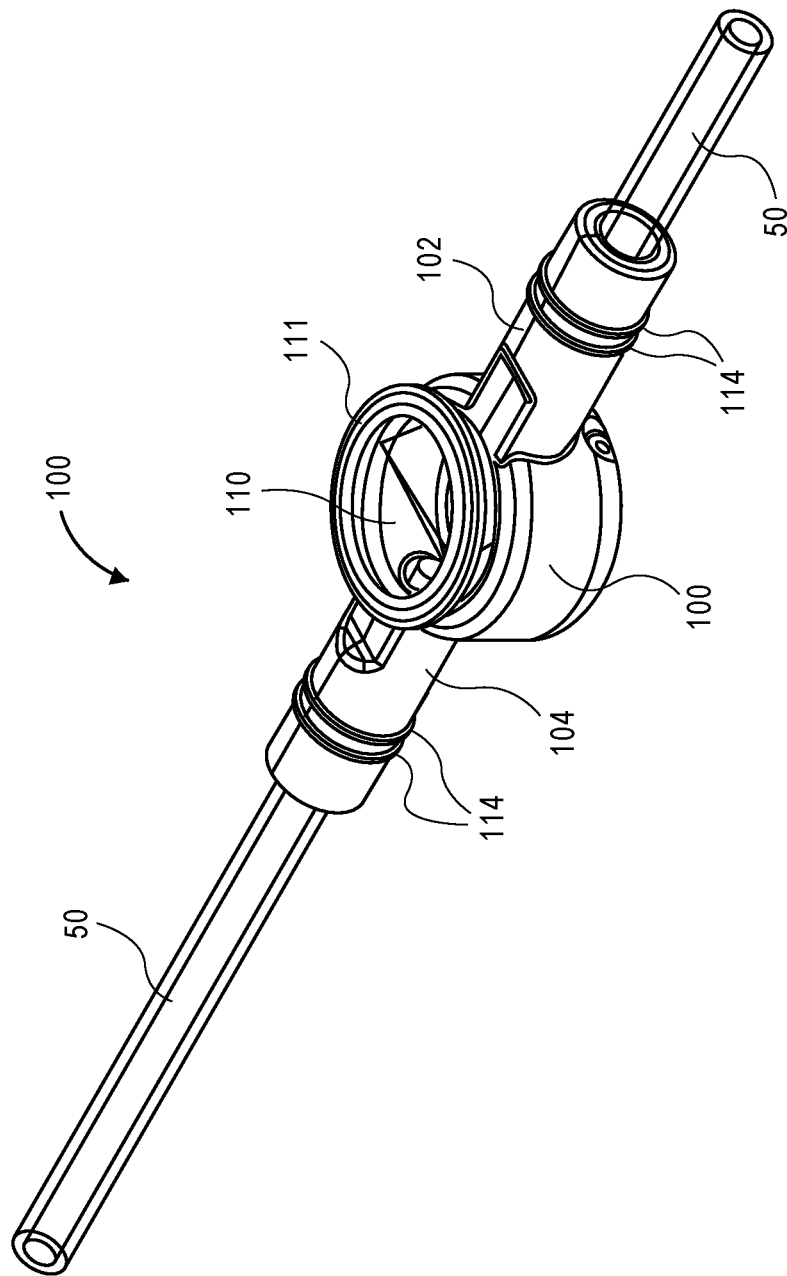

FIGS. 3A-3G illustrates another embodiment of a two-part jacket 100 according to another embodiment. The two-part jacket 100 includes a first half 102 and second half 104 joined via a hinge 105 having a pin therein like described herein in other embodiments (not show). Each half 102, 104 of the two-part jacket 100 includes a semi-circular inner surface along a portion thereof for holding the unreinforced polymer conduit 50. In addition, each half 102, 104 includes respective inner recessed segments 106, 108 that form a larger diameter passageway within the two-part jacket 100. These inner recessed segments 106, 108 are dimensioned to hold a bulbous or extending region 57 that is formed in the unreinforced polymer conduit 50 as seen in FIGS. 3B and 3D. For example, in this embodiment, a longer length of unreinforced polymer conduit 50 may extend from both sides of the two-part jacket 100 as seen in FIGS. 3D, 3F, and 3G. The bulbous or extending regions 57 are locked into the respective inner recessed segments 106, 108 when the two-part jacket 100 is closed around them preventing migration or movement of the unreinforced polymer conduit 50 relative to the two-part jacket 100 (e.g., no axial movement in addition to being constrained circumferentially). In this embodiment, the two-part jacket 100 also includes a mounting region or mount 110 that is used to secure, for example, a sensor 112 as seen in FIG. 3C. The mounting region 110 may be designed to receive an instrument, sensor, sampling device, or other apparatus. The sensor 112 may include, for instance, a pressure sensor that measures pressure of the fluid via contact with a portion of the unreinforced polymer conduit 50. In this embodiment, a sensor liner 111 is located on the mounting region 110 and interposed between the sensor 112 and the actual fluid passing through the unreinforced polymer conduit 50. Additional types of sensors 112 that can be included within or incorporated into the two-part jacket 100 include those sensors disclosed, for example, in PCT Publication No. WO2015/109209, which is incorporated by reference herein. The two-part jacket 100 also includes ridges 114 on the exterior thereof that may be used to position and retain a fastener 116 such as flexible or zip tie as is illustrated in FIG. 3C.

Figure 4A:
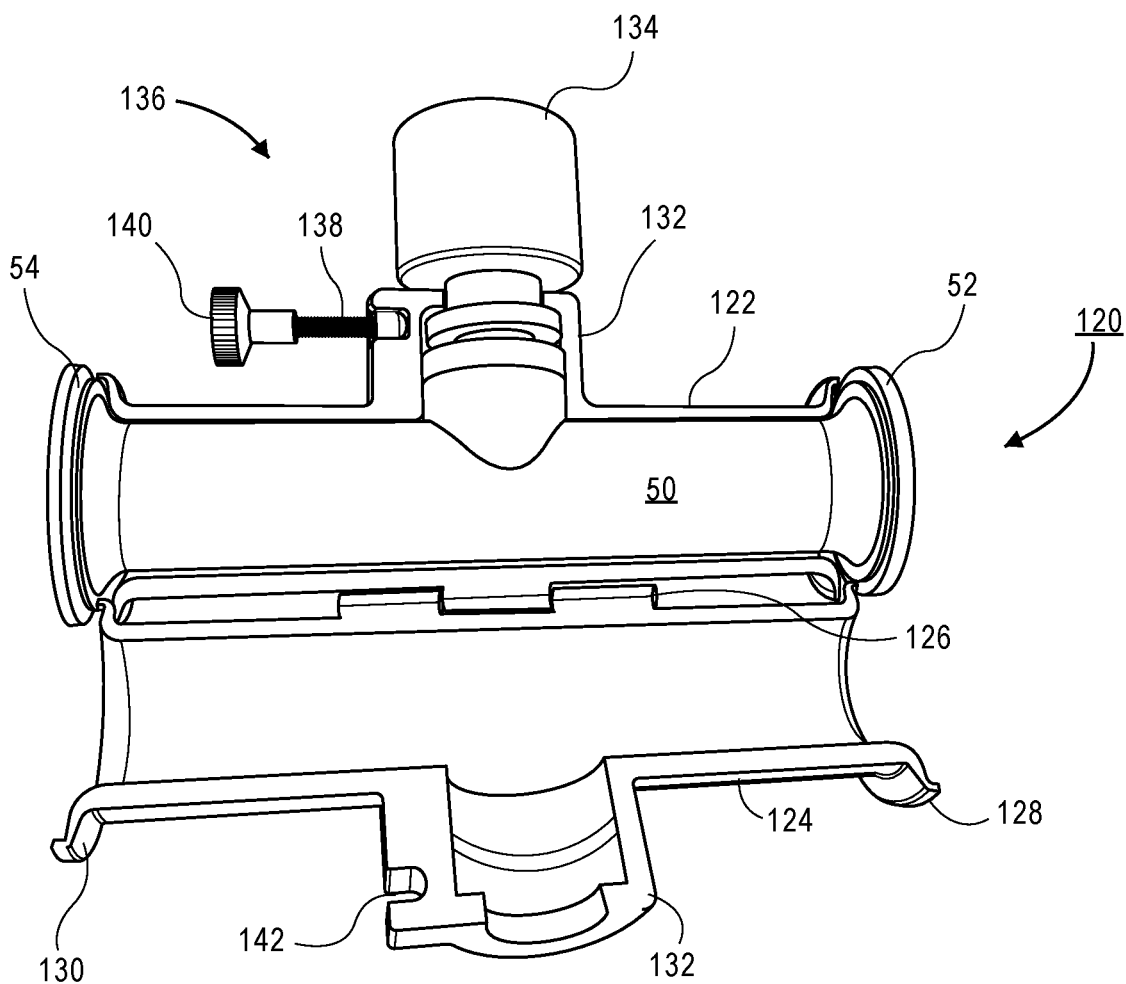
FIG. 4A illustrates another embodiment of a fluid management system that illustrates a two-part jacket enclosing a segment of unreinforced polymer conduit. In this embodiment, a sensor is disposed in the jacket.

FIG. 4A illustrates another embodiment of a two-part jacket 120. In this embodiment, the two-part jacket 120 includes a first half 122 and a second half 124 held together via a hinge 126. A segment of unreinforced polymer conduit 50 is illustrated positioned in one of the halves 122. In this embodiment, the two-part jacket 120 includes the optional end flanges 128, 130 that hold respective flanges 52, 54 of the unreinforced polymer conduit 50 as described herein. In this embodiment, the two-part jacket 120 includes a sensor mount 132 that formed in the halves 122, 124 of the two-part jacket 120. The sensor mount 132 is dimensioned to receive a sensor 134 therein. The sensor 134 may be, for instance, a pressure sensor. For example, in this embodiment, the portion of the unreinforced polymer conduit 50 that is closest to the pressure sensor 134 may include a thin wall or membrane that contacts a sensing surface of the pressure sensor 134. In this regard, there is no physical contact between the pressure sensor 134 and the actual fluid passing through the unreinforced polymer conduit 50. In other embodiments, however, the sensing surface or sensing element may penetrate into the interior of the unreinforced polymer conduit 50 so that directed contact is made with the fluid (e.g., pH sensor, conductivity sensor, or the like). A fastener 136 is mounted on the two-part jacket 120 and, in this embodiment, is formed by a threaded latch 138 and knob 140 as previously described. A slot or notch 142 is formed in the opposing side of the second half 124 which is dimensioned to receive the threaded latch 138. The knob 140 can be tightened to lock the two-part jacket 120 around the unreinforced polymer conduit 50 or loosened such that the two-part jacket 120 can be opened. The unreinforced polymer conduit 50 and/or the sensor 134 may be replaced.

Figure 4B:
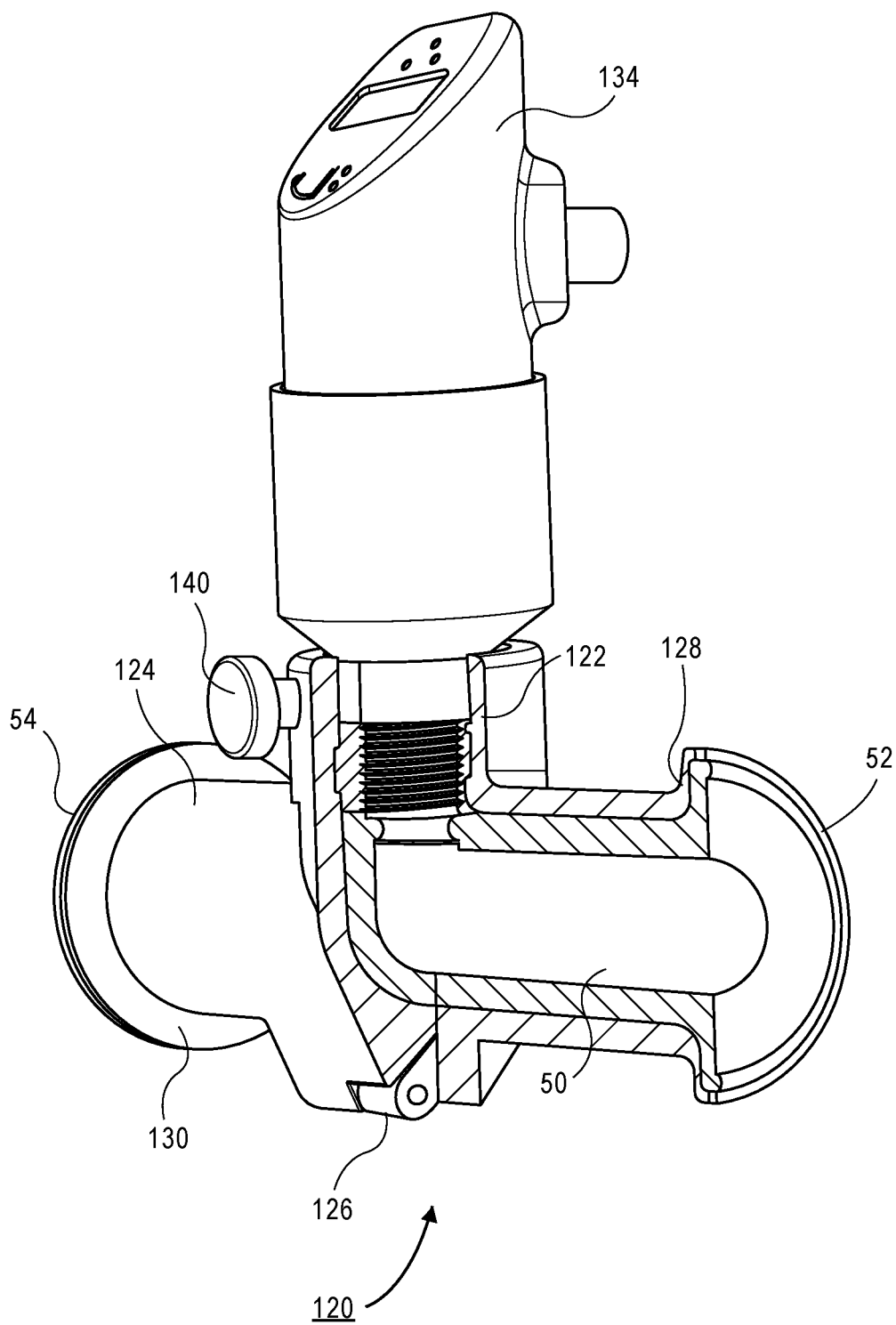
FIG. 4B illustrates another embodiment of a fluid management system that incorporates a pressure sensor.

FIG. 4B illustrates another version of the embodiment of a two-part jacket 120 that incorporates a pressure sensor 134. In this embodiment, the two-part jacket 120 includes a first half 122 and a second half 124 held together via a hinge 126. FIG. 4B illustrates a partially cut-away view showing how the end of the pressure sensor 134 interfaces with the unreinforced polymer conduit 50. In this embodiment, the end of the pressure sensor 134 does not contact product or reagents within the unreinforced polymer conduit 50. Rather, the end of the pressure sensor 134 contacts the wall of the unreinforced polymer conduit 50 and can sense pressure through the wall. The wall of the unreinforced polymer conduit 50 may include a thinned-out or narrowed section (e.g., membrane) so that pressure can be readily measured by the pressure sensor 134.

FIG. 5 illustrates another embodiment of a two-part jacket 150. In this embodiment, the two-part jacket 150 includes a first half 152 and a second half 154 held together via a hinge 156. In this embodiment, the two-part jacket 150 is secured in the closed configuration using a friction fit arrangement. Specifically, a first half 152 includes multiple posts 158 that are tapered and dimensioned to fit within corresponding apertures 160 located in bosses 162 disposed the second half 154. Similarly, the second half 154 includes multiple posts 164 that are tapered and dimensioned to fit within corresponding apertures 166 located in bosses 168 disposed the first half 152. In this embodiment, the two-part jacket 150 is curved but could take any number of shapes. Still referring to FIG. 5, on the exterior of the two-part jacket 150 are located grooves 170 that may be dimensioned to receive a fastener 172 such as a flexible tie as described herein. While the friction fit does secure the two-part jacket 150 in the closed configuration, the addition of the fastener(s) 172 further secures the two-part jacket 150. Of course, in some embodiments, the friction fitting may suffice and securely lock the two halves 152, 154 together.

FIGS. 6A-6E illustrate another embodiment of a fluid management system 200. This embodiment incorporates a manually operated two-part bleed valve 202 with a two-part jacket 230 having a 90° bend (other bends and shapes are contemplated). In this embodiment, part of two-part jacket 230 interlocks with the two-part bleed valve 202. The two-part bleed valve 202 includes two halves 204, 206 that are connected via a hinge 208. The two halves 204, 206 are secured using a threaded latch 210 and knob 212 as described previously herein. The two-part bleed valve 202 includes an optional flange 214 at one end. The two-part bleed valve 202 includes a manually operated bonnet 216 that moves an actuator 218 (FIG. 6C) back and forth to modulate flow within the unreinforced polymer conduit 50. That is to say, the actuator 218 contacts the outside of the unreinforced polymer conduit 50 contained therein to adjust the flow by adjusting the effective diameter or cross sectional area of the lumen in the unreinforced polymer conduit 50. In this embodiment, the actuator 218 is angled so as to minimize any hold-up volume within the valve 202.

The two-part jacket 230 includes a first half 232 and a second half 234 that are connected via a hinge 236. The first half 232 and a second half 234 may be secured to one another using a friction fit like that described for FIG. 5. The two-part jacket 230 includes recesses 238 that can accept a fastener such as the flexible tie 172 of FIG. 5. In this embodiment, the end of the two-part jacket 230 includes a shouldered end 240 (FIG. 6C). The body of the two-part valve 202 includes a recess 209 that is dimensioned to receive and accommodate the shouldered end 240 in a tight-fitting arrangement. In this embodiment, the two-part jacket 230 includes a "male" end while the two-part valve 202 includes a mating "female" end. The shouldered end 240 can be pressed into the recess 209 to form an interlocking structure between the two-part jacket 230 and the two-part valve 202. While in this embodiment, the two-part jacket 230 includes the male end, an alternative construction could have the two-part valve 202 with the male end and the female end could be in the end of the two-part jacket 230. The key is that these two components are interlocking with one another. Note that with the male/female interface securing the two-part jacket 230 to the two-part valve 202 there still may be relative rotation between the two components. In this regard, there may be a rotational degree of freedom between the two-part jacket 230 and the two-part valve 202 even though they are secured to one another.

Figure 6E:
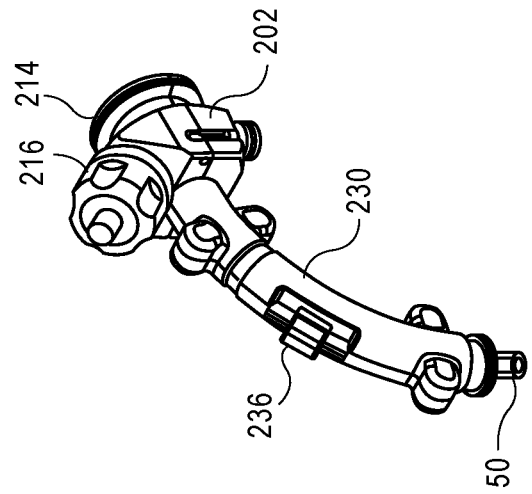
FIG. 6E illustrates a perspective view of the fluid management system of FIG. 6A.
Figure 6D:
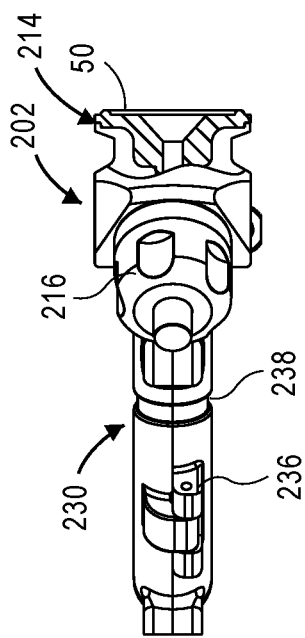
FIG. 6D illustrates another top view of a fluid management system of FIG. 6A with part of the valve body removed to show the conduit therein.

FIGS. 6C, 6D, and 6E illustrate the unreinforced polymer conduit 50 contained within the two-part jacket 230. In this embodiment, one end of the unreinforced polymer conduit 50 may contain a flange 52 that is dimensioned to fit within the flange 214 as explained previously. Of course, the flange 52 may be optional in other embodiments in which there is no flange 214 on the valve 202.

Figure 7A:
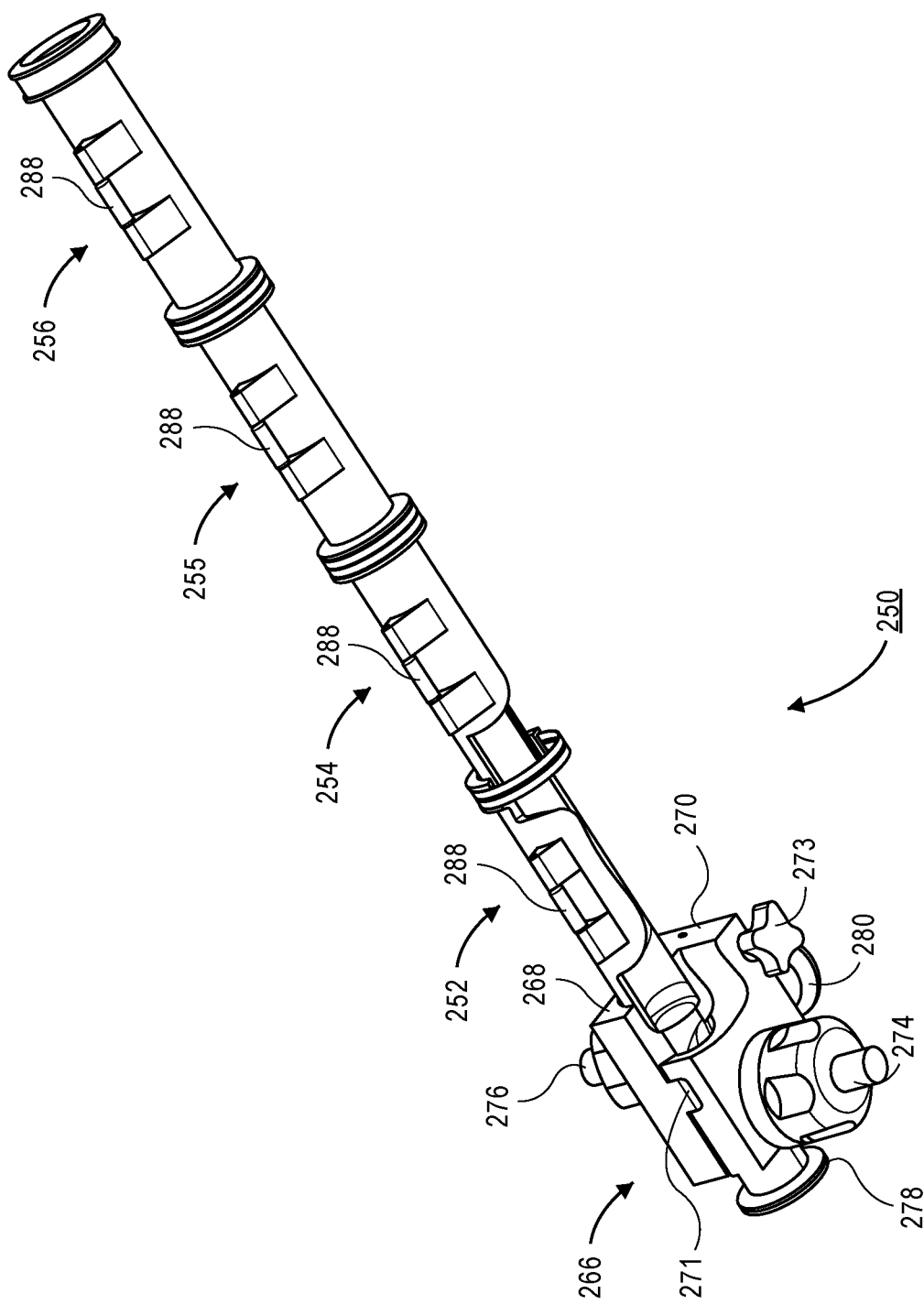
FIG. 7A illustrates another embodiment of a fluid management system.
Figure 7B:
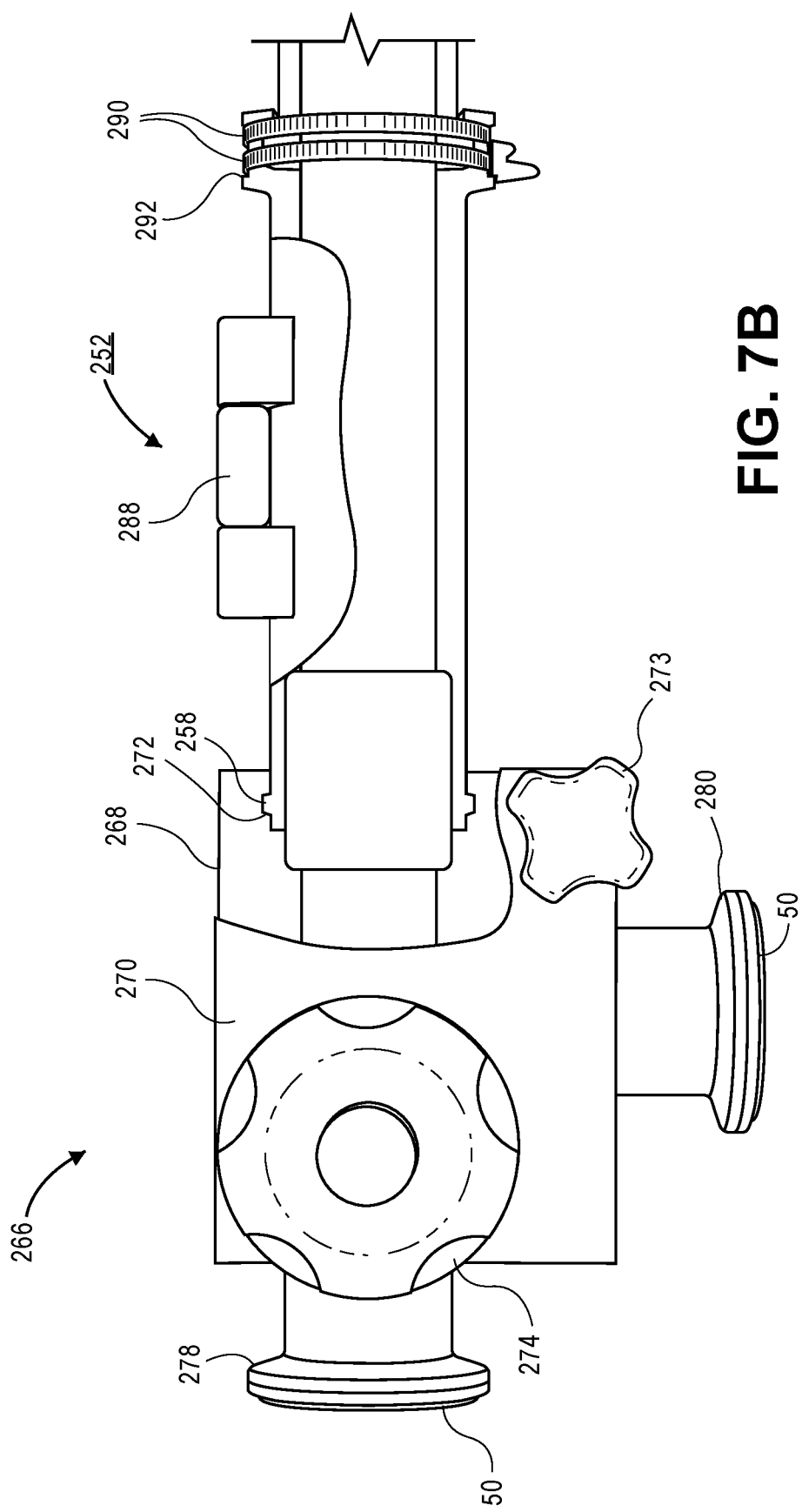
FIG. 7B illustrates a perspective view with a partial cut-away view of the interface between the two-part jacket and the two-part valve body.
Figure 7C:
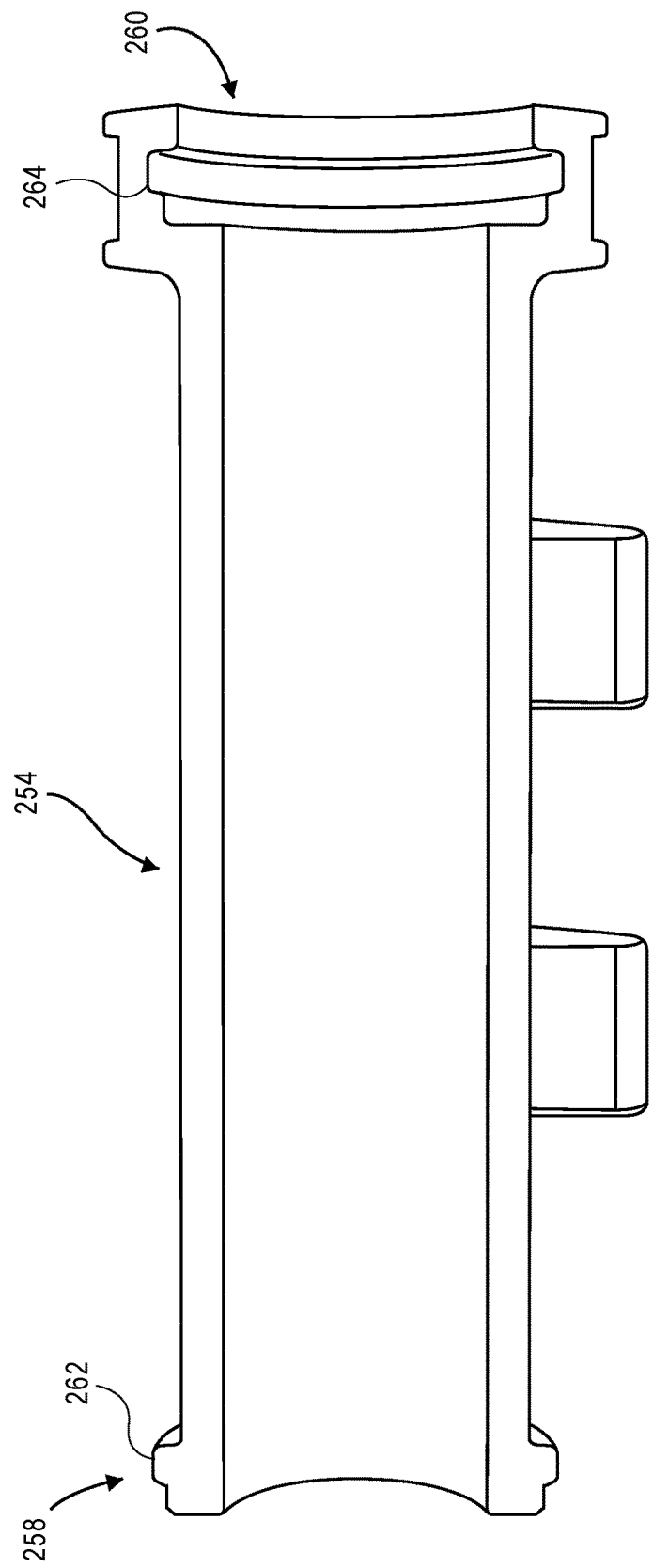
FIG. 7C illustrates a cross-sectional view of a jacket.

FIGS. 7A-7C illustrate another embodiment of fluid management system 250. In this embodiment, multiple (i.e., four) two-part jackets 252, 254, 255, 256 are connected end-to-end to one another via interlocking connections as best seen in FIG. 7C. For example, adjacent jackets 252, 254, 255, 256 are connected to one another using a male end 258 that interfaces with a female end 260. FIG. 7C illustrates one such jacket 254 that includes one male end 258 that includes a shoulder 262 that is dimensioned to fit within a corresponding recess 264 in a female end 260 as illustrated in FIG. 7C. Referring back to FIG. 7A, the fluid management assembly 250 includes a two-part valve body 266 that interlocks with a male end 258 of one of the two-part jackets 252. The two-part valve body 266 includes two mating halves 268, 270 connected via a hinge 271 similar to those described herein in the context of other embodiments. A recess 272 (FIG. 7B) is located in each respective half 268, 270 and is dimensioned to mate with the male end 258 of the two-part jacket 252. In this embodiment, the two-part valve body 266 includes two manually operated valves 274, 276 (manually operated bonnets that move corresponding actuators as described herein). The two-part valve body 266 includes two flanges 278, 280 that can be used to connect other components as explained herein. The two-part jacket 252 interlocks with the two-part valve body 266 using the fit between the male end 258 and the recess 272. The two-part valve body 266 is locked in the closed state using a fastener 273 (e.g., knob and threaded latch).

Each two-part jacket 252, 254, 255, 256 is formed from two halves connected via a hinge 288. In the embodiment of FIGS. 7A-7C, the two-part jackets 252, 254, 255, 256 are secured in the closed configuration using one or more zip ties 290 as seen in FIG. 7B. The zip ties 290 may rest within a recess 292 formed by the connection between adjacent two-part jackets 252, 254, 255, and 256. FIG. 7B illustrates an unreinforced polymer conduit 50 contained within the both the two-part valve body 266 and the two-part jackets 252, 254, 255, 256.

Figure 8B:
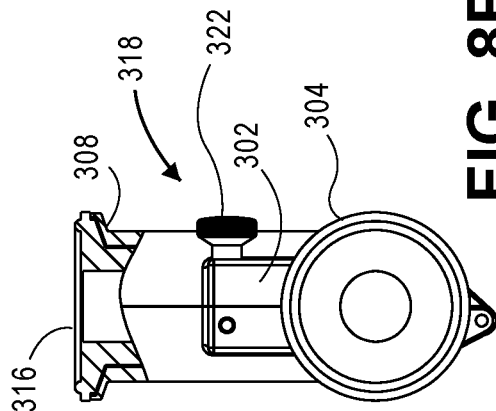
FIG. 8B illustrates an end view of the embodiment of FIG. 8A.
Figure 8D:
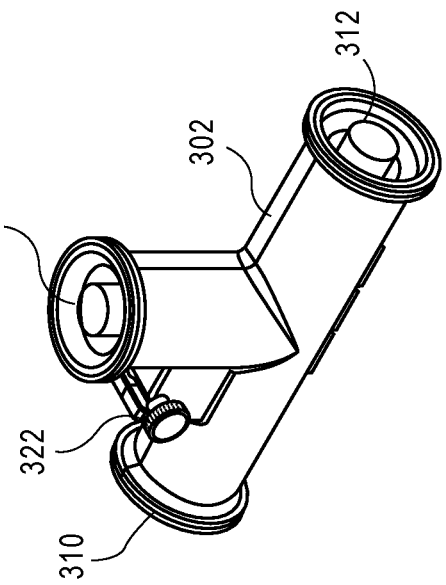
FIG. 8D illustrates a perspective view of the embodiment of FIG. 8A.
Figure 8A:
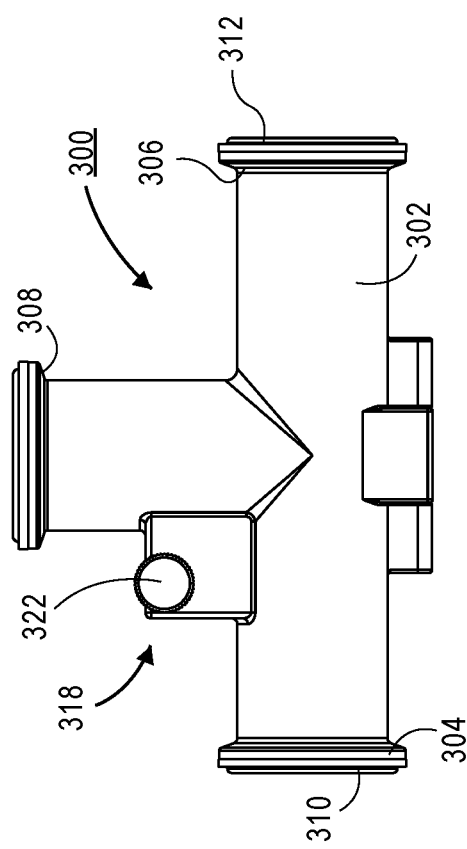
FIG. 8A illustrates a side view of another embodiment of a fluid management system that includes a sensor or gauge guard membrane.
Figure 8C:
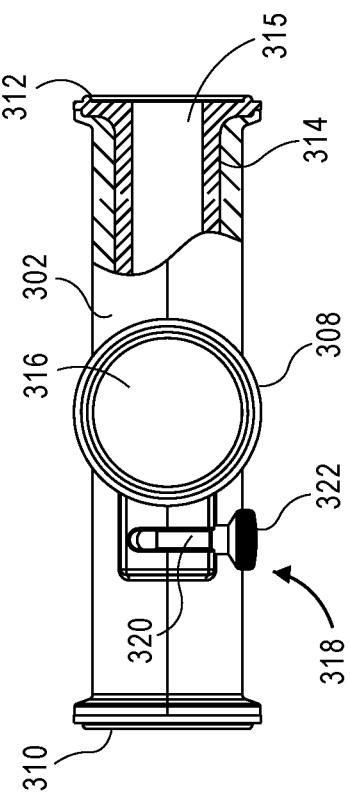
FIG. 8C illustrates a top view of the embodiment of FIG. 8A with a partial cut-away view showing the unreinforced conduit contained therein.
Figure 9B:
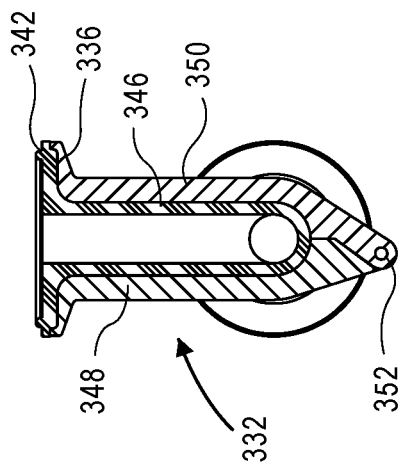
FIG. 9B illustrates an end view of the embodiment of FIG. 9A.
Figure 9D:
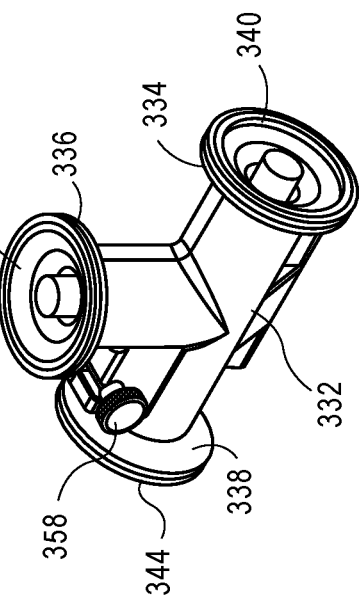
FIG. 9D illustrates a perspective view of the embodiment of FIG. 9A.
Figure 9A:
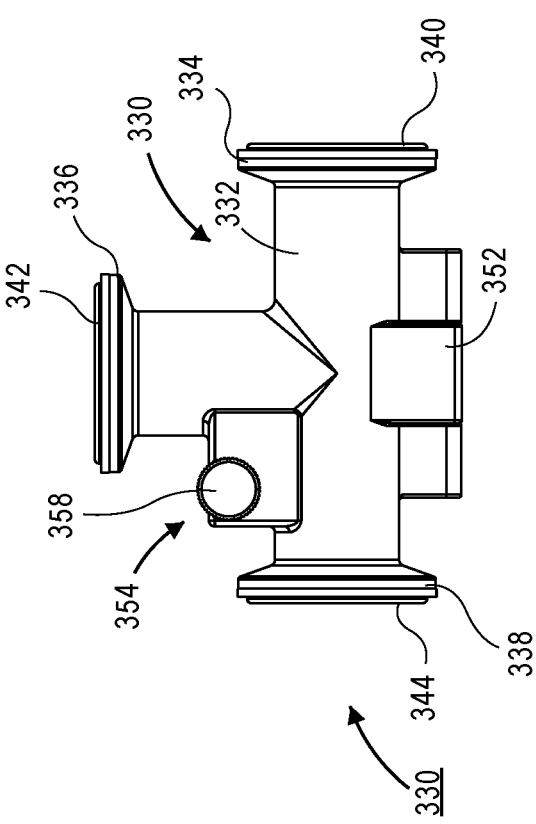
FIG. 9A illustrates a side view of another embodiment of a fluid management system in the form of a tee.
Figure 9C:
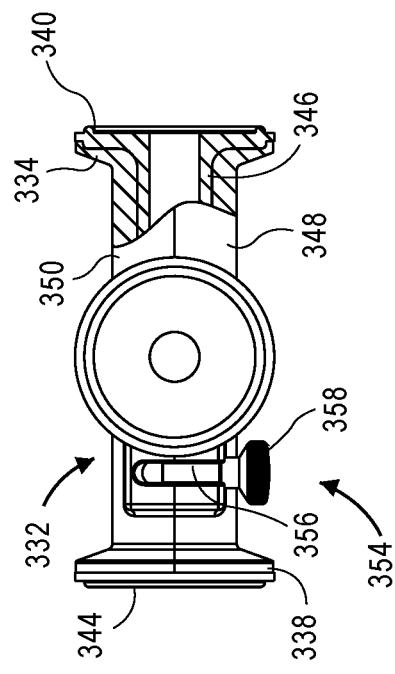
FIG. 9C illustrates a top view of the embodiment of FIG. 9A with a partial cut-away view showing the unreinforced conduit contained therein.

FIGS. 8A-8D illustrate another embodiment of a fluid management system 300. In this embodiment, a two-part jacket 302 is provided that includes three ends 304, 306, 308. Two ends 304, 306 include flanges that hold respective ends 310, 312 of an unreinforced polymer conduit 314. Fluid can pass through the conduit 314 via a lumen 315 as illustrated in FIG. 8C. A tee structure is formed in the two-part jacket 302 that terminates at the flanged end 308. The flanged end 308 holds a capped-off portion of the unreinforced polymer conduit 314. Fluid thus can enter the portion of the conduit 314 within the tee structure that terminates at flanged end 308 but the fluid cannot leave this segment of the conduit 314 because a narrow membrane 316 covers the end of the conduit 314. A pressure sensor (not shown) can be positioned on the flanged end 308 whereby a pressure sensing surface or end comes into contact with the membrane 316. The pressure sensing surface or end does not come into contact with any product or reagents carried by the unreinforced polymer conduit 314; yet the pressure from the fluid is transmitted through the membrane 316 to the pressure sensing surface or end of the pressure sensor. The two-part jacket 302 can be secured closed using the fastener 318 that includes a threaded latch 320 element and knob 322 that operates as previously described with respect to similar fasteners.

FIGS. 9A-9D illustrate another embodiment of a fluid management system 330. In this embodiment, a two-part jacket 332 is provided that includes three flanged ends 334, 336, 338 that form a tee structure. The three flanged ends 334, 336, 338 accepted correspondingly shaped flanged ends 340, 342, 344 of an unreinforced polymer conduit 346. The two-part jacket 332 includes two halves 348, 350 that pivot via hinge 352. Fastener 354 that includes a threaded latch 356 element and knob 358 can be selectively tightened or loosened to close/open the two-part jacket 332. The fluid management system 330 does not include any valve but rather serves as an exoskeletal structure that is used to encapsulate the tee-shaped unreinforced polymer conduit 346. In other configurations, this fluid management system 330 can be integrated with other components and devices. This includes valves as well as other two-part jackets as disclosed and described herein. Thus, the fluid management system 330 may serve as one modular component in a larger system that made from assembling individual components together.

Figure 10C:
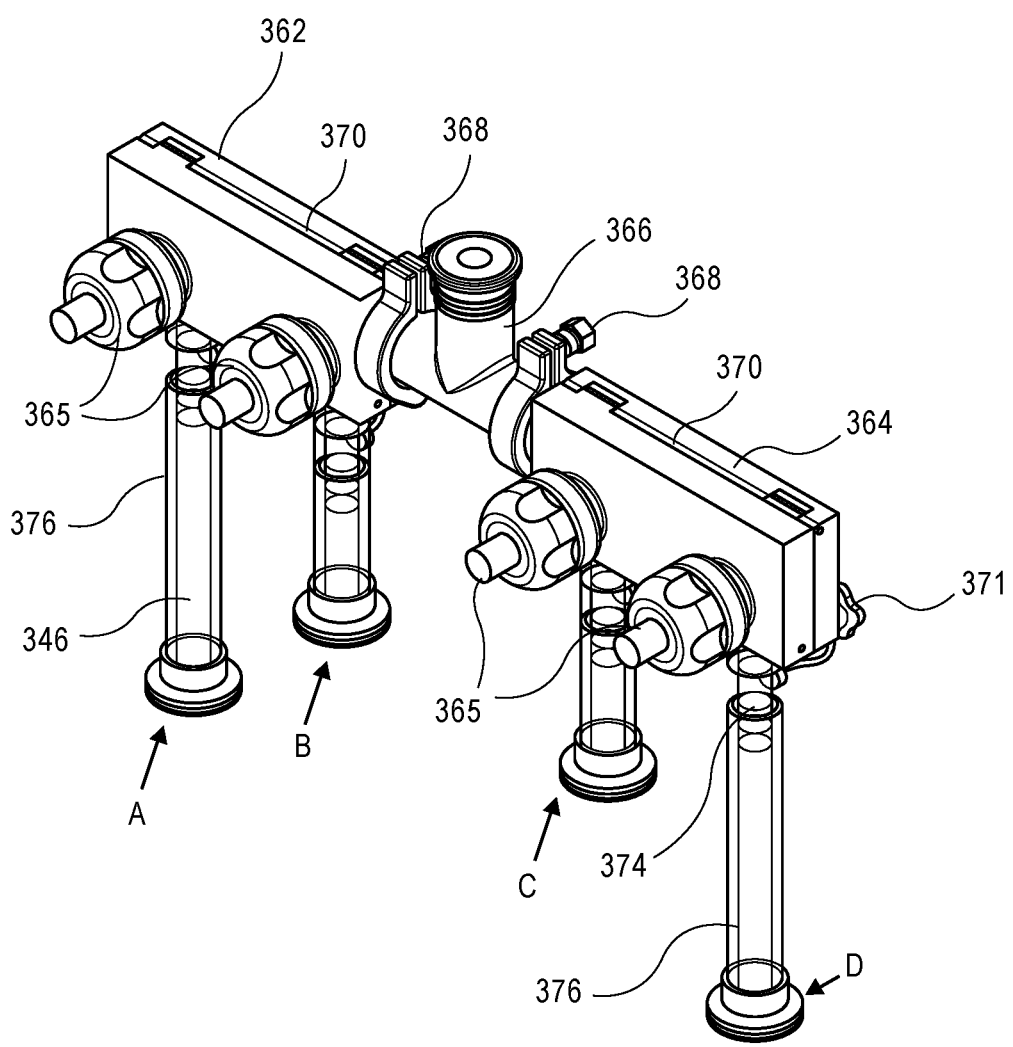
FIG. 10C illustrates a perspective view of another embodiment of the fluid management system of FIG. 10A.

FIGS. 10A-10C illustrate another embodiment of a fluid management system 360. In this system 360, there is a first two-part valve body 362 that is connected to a second two-part valve body 364 using a two-part jacket 366 in the shape of a Tee. Each two-part valve body 362, 364 includes two (2) manual valves 365 disposed therein that are actuated to open/close flow to respective conduit lines A, B, C, D. A single piece of unreinforced polymer conduit 346 is encapsulated by the first two-part valve body 362, the second two-part valve body 364 and the two-part jacket 366. In this embodiment, the two-part jacket 366 is connected to the first two-part valve body 362 and the second two-part valve body 364 using flanged ends that mate with corresponding flanged ends of the first and second two-part valve bodies 362, 364. A clamp 368 can be used to secure the flanges to one another. Each valve body 362, 364 is formed in two halves and includes a hinge 370. The valve bodies 362, 364 can be secured in a closed state using a fastener 371 (e.g., knob and threaded latch) like those disclosed herein. Likewise, the two-part jacket 366 is formed in two halves and includes a hinge 372. In this embodiment, the two-part jacket 366 has a Tee configuration. One open end of the tee-shaped jacket 366 is illustrated in FIG. 10C. In this illustrated embodiment, pressure transducers 374 are located at intermediate points along the unreinforced polymer conduit 346 and bridge the unreinforced polymer conduit 346 to segments of braided polymer conduit 376 (e.g., braided silicone) that are over molded over unreinforced polymer conduit 346.

Figure 11C:
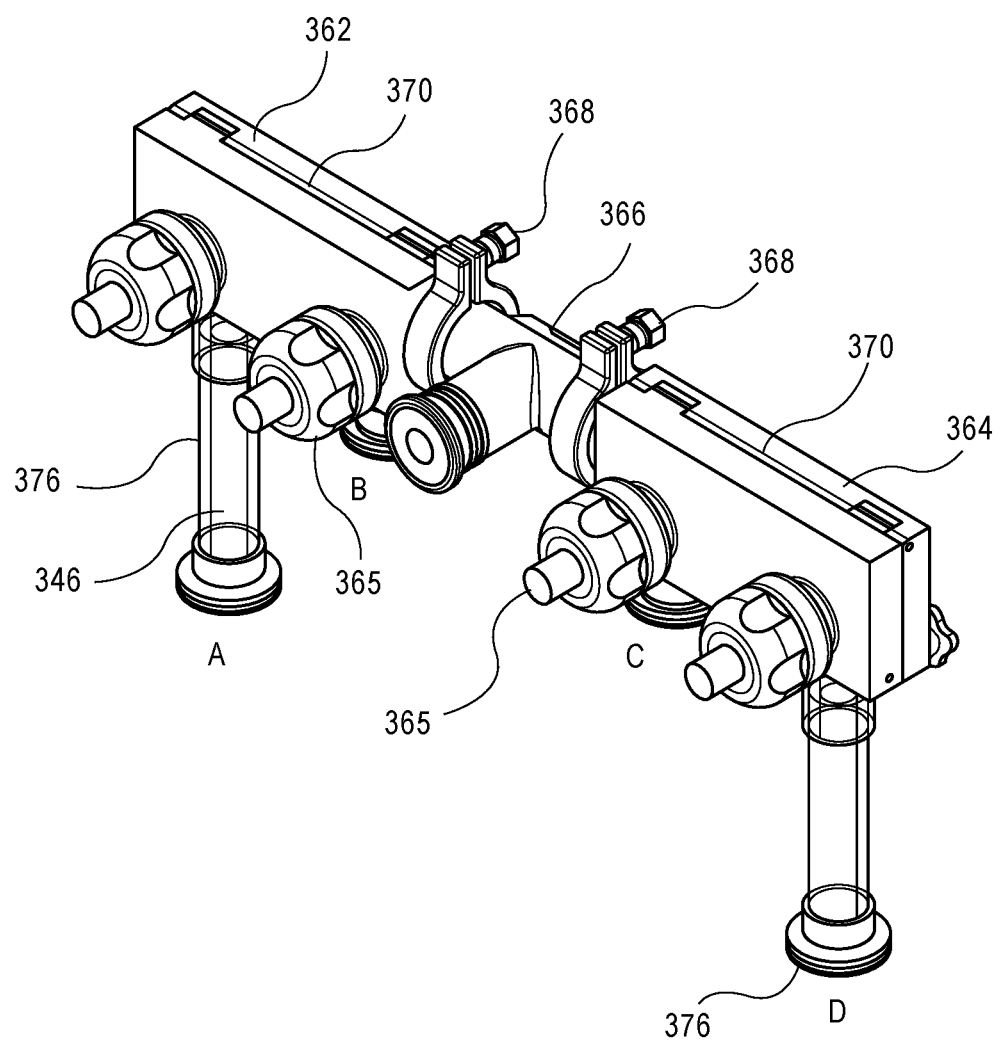
FIG. 11C illustrates a perspective view of another embodiment of the fluid management system of FIG. 11A.
Figure 12C:
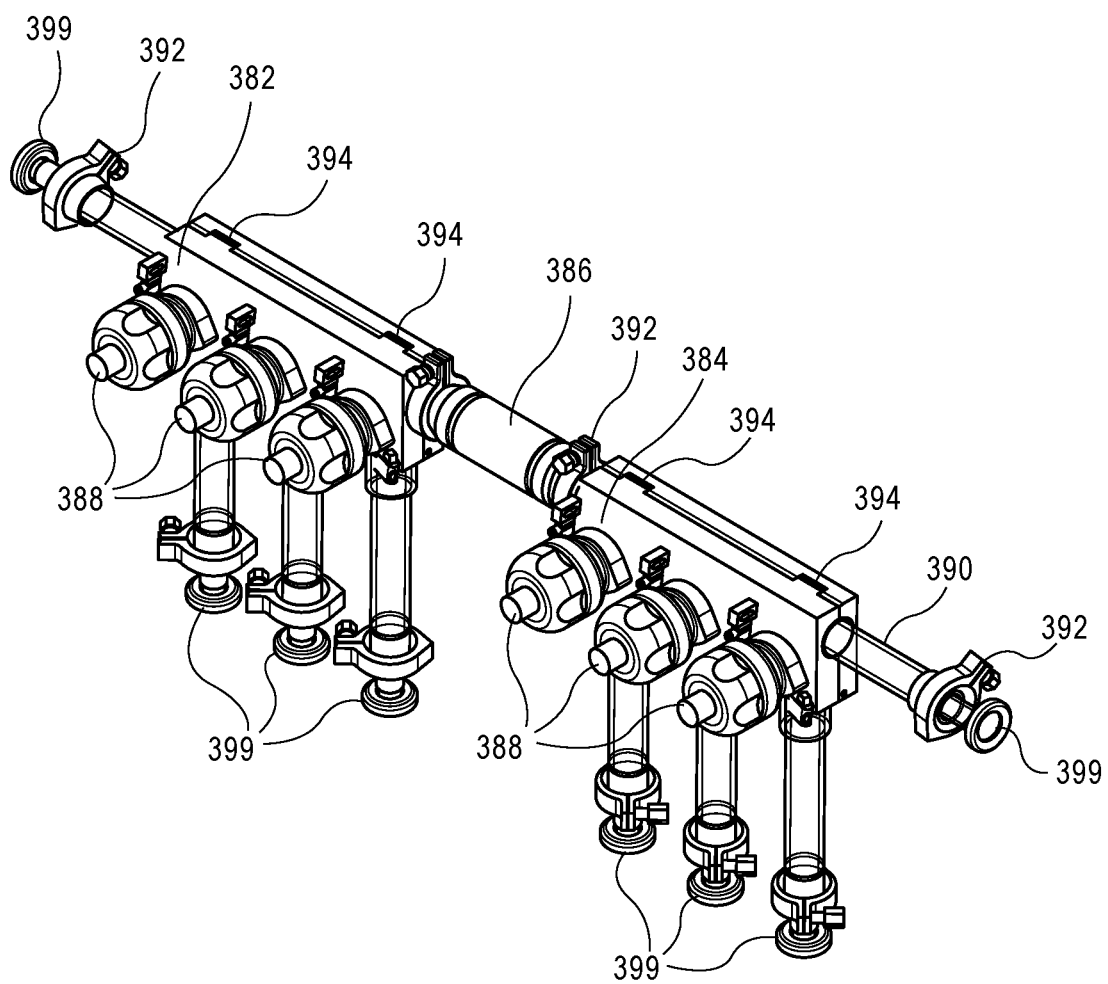
FIG. 12C illustrates a perspective view of another embodiment of the fluid management system of FIG. 12A.

FIGS. 11A-11C illustrate an alternative embodiment of the fluid management system 360' of FIGS. 10A-10C. In this embodiment, there are no pressure transducers 374 and now only two legs have braided polymer conduit 376. The tee-shaped jacket 366 is also oriented in a different orientation. FIGS. 12A-12C illustrate another embodiment of a fluid management system 380. In this system 380, there is a first two-part valve body 382 that is connected to a second two-part valve body 384 using a two-part jacket 386 that has a straight shape. Each two-part valve body 382, 384 includes three (3) manual valves 388 disposed therein that are actuated to open/close flow to respective conduit lines A, B, C, D, E, F. A single piece of unreinforced polymer conduit 390 is partially encapsulated by the first two-part valve body 382, the second two-part valve body 384 and the two-part jacket 386. In this embodiment, the two-part jacket 386 is connected to the first two-part valve body 382 and the second two-part valve body 384 using flanged ends that mate with corresponding flanged ends of the first and second two-part valve bodies 382, 384. A clamp 392 can be used to secure the flanges to one another. Each valve body 382, 384 is formed in two halves and includes a hinge or multiple hinges 394. The valve bodies 382, 384 can be secured in a closed state using a fastener 396 like those disclosed herein. Likewise, the two-part jacket 386 is formed in two halves and includes a hinge 398. In this embodiment, the two-part jacket 386 has straight configuration although other shapes are contemplated. In this embodiment, the unreinforced polymer conduit 390 is only partially enclosed by the valve bodies 384, 386 and the two-part jacket 386 leaving exposed ends. This embodiment may be suitable for lower pressure applications. Still referring to FIGS. 12A-12C, disposable aseptic connectors 399 are positioned on the ends of the main line of the conduit 390 and the legs of the same. Connections to the connectors 399 can be made using clamps 392.

Figure 13C:
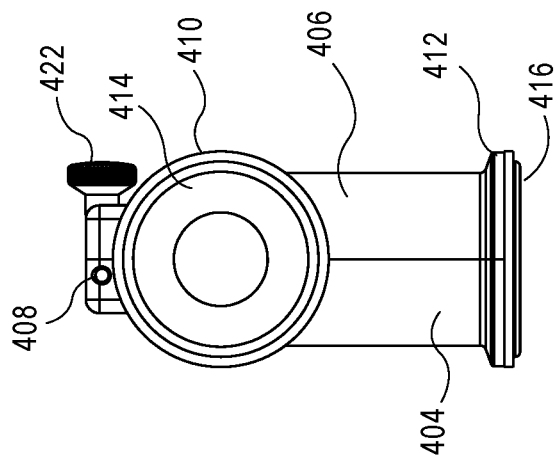
FIG. 13C illustrates an end view of the fluid management system of FIG. 13A.
Figure 13A:
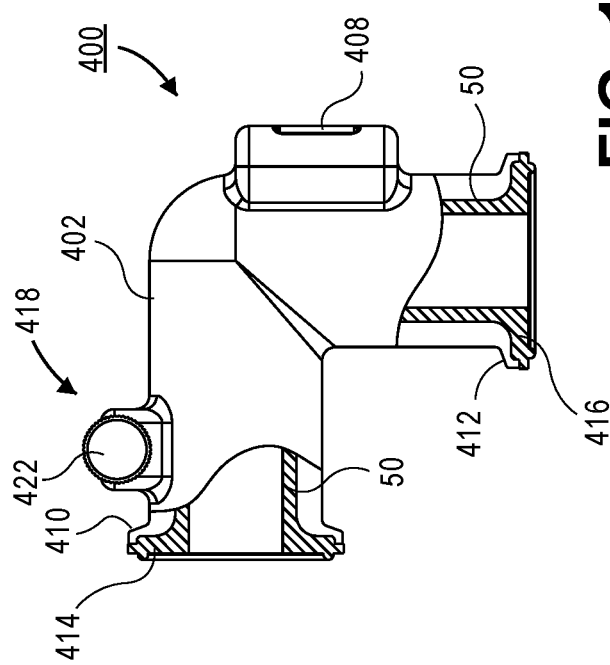
FIG. 13A illustrates a partially cut-away top view of a fluid management system according to one embodiment.
Figure 13B:
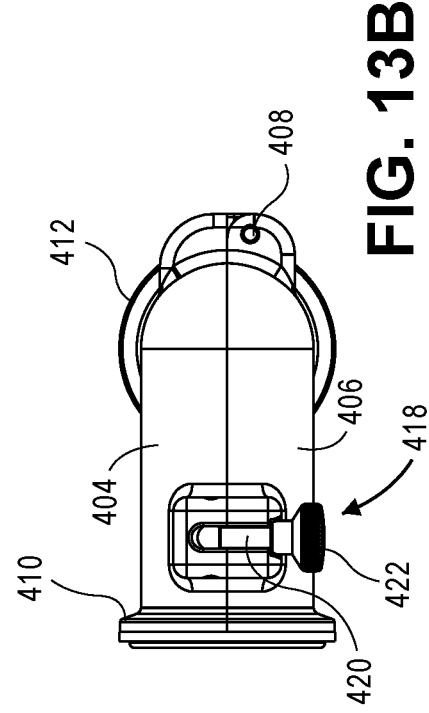
FIG. 13B illustrates a side view of the fluid management system of FIG. 13A.

FIGS. 13A-13C illustrates another embodiment of a fluid management assembly 400 in the form of an elbow. The elbow is formed from a two-part jacket 402 that includes a first half 404 and second half 406 that are connected to another via a hinge 408. The two-part jacket 402, when closed, defines a passageway that holds an unreinforced polymer conduit 50 therein in the elbow configuration. In this embodiment, there are optional flanges 410, 412 located on the two-part jacket 402 that receive corresponding flanges 414, 416 located on the unreinforced polymer conduit 50. A fastener 418 like that described herein that uses a threaded latch 420 and a knob 422 is used to secure the two-part jacket 402 in the closed state (and loosened to open the two-part jacket 402). The fastener 418 can quickly be loosened, for example, to open the two-part jacket 402 to replace the unreinforced polymer conduit 50 that is contained therein (i.e., used or contaminated) with another segment of unreinforced polymer conduit 50. While the elbow 400 in the illustrated embodiment turns 90°, in other embodiments, different angles could be used (e.g., 45°, 60°, or the like).

Figure 14C:
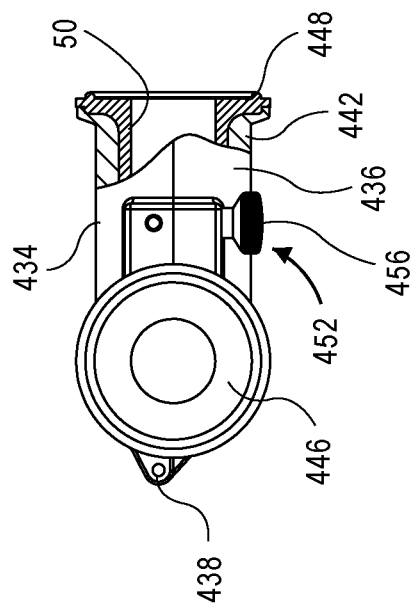
FIG. 14C illustrates a partially cut-away end view of the fluid management system of FIG. 14A.
Figure 14A:
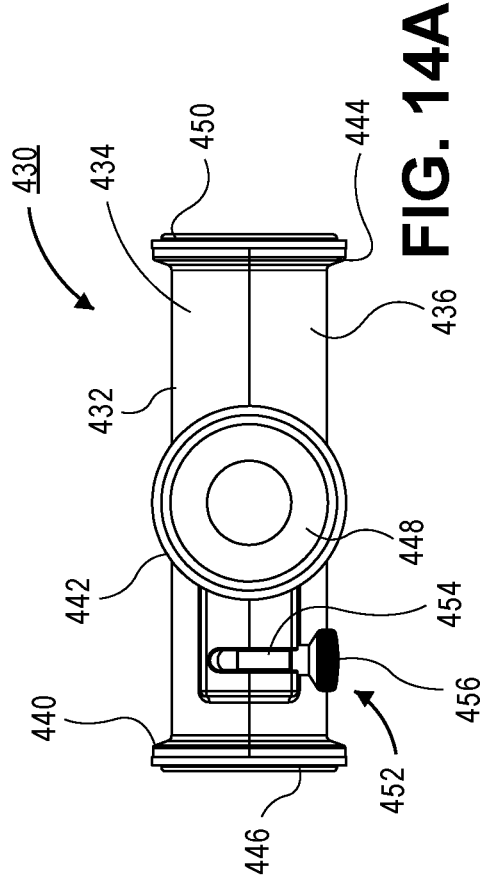
FIG. 14A illustrates a top view of a fluid management system according to one embodiment.
Figure 14B:
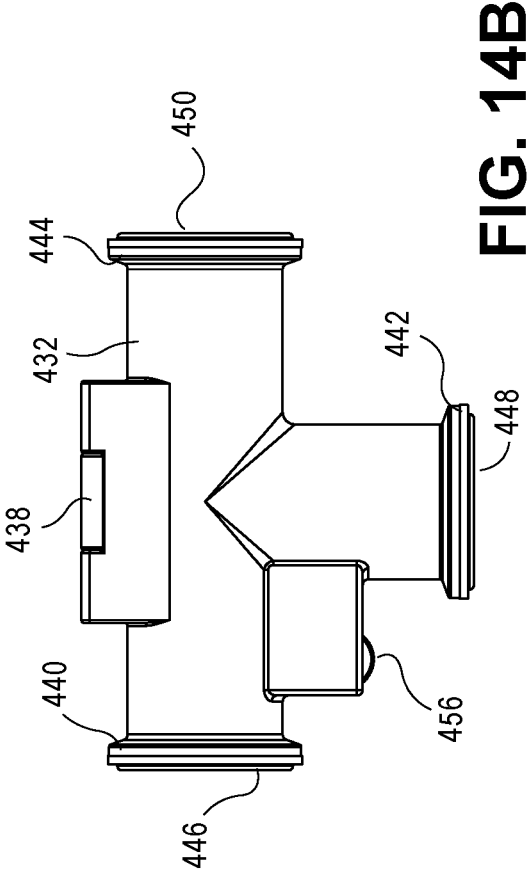
FIG. 14B illustrates a side view of the fluid management system of FIG. 14A.

FIGS. 14A-14C illustrate another embodiment of a fluid management assembly 430 in the form of a tee. The tee is formed from a two-part jacket 432 that includes a first half 434 and second half 436 that are connected to another via a hinge 438. The two-part jacket 432, when closed, defines a tee-shaped passageway that holds an unreinforced polymer conduit 50 therein in the tee configuration. In this embodiment, there are optional flanges 440, 442, 444 located on the two-part jacket 432 that receive corresponding flanges 446, 448, 450 located on the unreinforced polymer conduit 50. A fastener 452 like that described herein that uses a threaded latch 454 and a knob 456 is used to secure the two-part jacket 432 in the closed state (and loosened to open the two-part jacket 432). The fastener 452 can quickly be loosened, for example, to open the two-part jacket 432 to replace the unreinforced polymer conduit 50 that is contained therein (i.e., used or contaminated) with another segment of unreinforced polymer conduit 50.

Figure 15D:
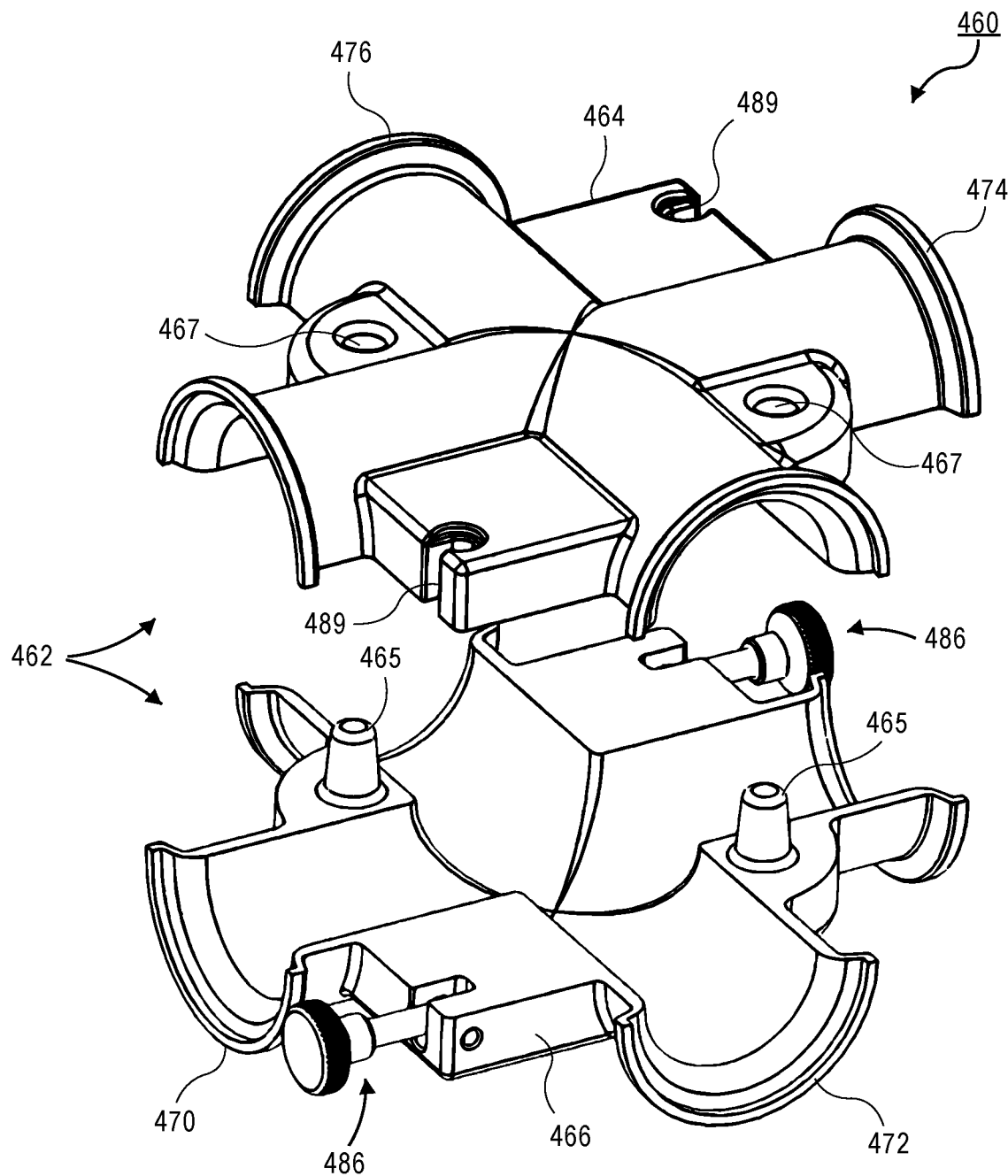
FIG. 15D illustrates an exploded, perspective view of the fluid management system of FIG. 15A showing the two halves of the two-part jacket separated from one another. The unreinforced polymer conduit is removed for clarity purposes.

FIGS. 15A-15D illustrate another embodiment of a fluid management assembly 460 in the form of a cross. The cross is formed from a two-part jacket 462 that includes a first half 464 and second half 466. As seen in FIG. 15D, the two halves 464, 466 of the cross-shaped assembly 460 is held together using a pair of "male" dowels 465 that extend from the second half 466 and are inserted into corresponding recesses 467 located in the first half 464. A friction-fit may be formed between the dowels 465 and the recesses 467. The two-part jacket 462, when closed, defines a tee-shaped passageway that holds an unreinforced polymer conduit 50 therein in the tee configuration. In this embodiment, there are optional flanges 470, 472, 474, 476 located on the two-part jacket 462 that receive corresponding flanges 478, 480, 482, 484 located on the unreinforced polymer conduit 50. A pair of fasteners 486 like that described herein that uses a threaded latch 488 and a knob 490 is used to secure the two-part jacket 462 in the closed state (and loosened to open the two-part jacket 462). The threaded latches 488 are pivoting and rotate into respective notches 489 located on opposing sides of the two-part jacket 462. The fastener 486 can quickly be loosened, for example, to open the two-part jacket 462 to replace the unreinforced polymer conduit 50 that is contained therein (i.e., used or contaminated) with another segment of unreinforced polymer conduit 50. While this embodiment is illustrated as not using a hinge it should be understood that as an alternative one or more hinges may be used as an alternative to the dowels 465 and recesses 467. Likewise, other embodiments which use hinges may utilize similar dowels and recess.

Figure 16A:
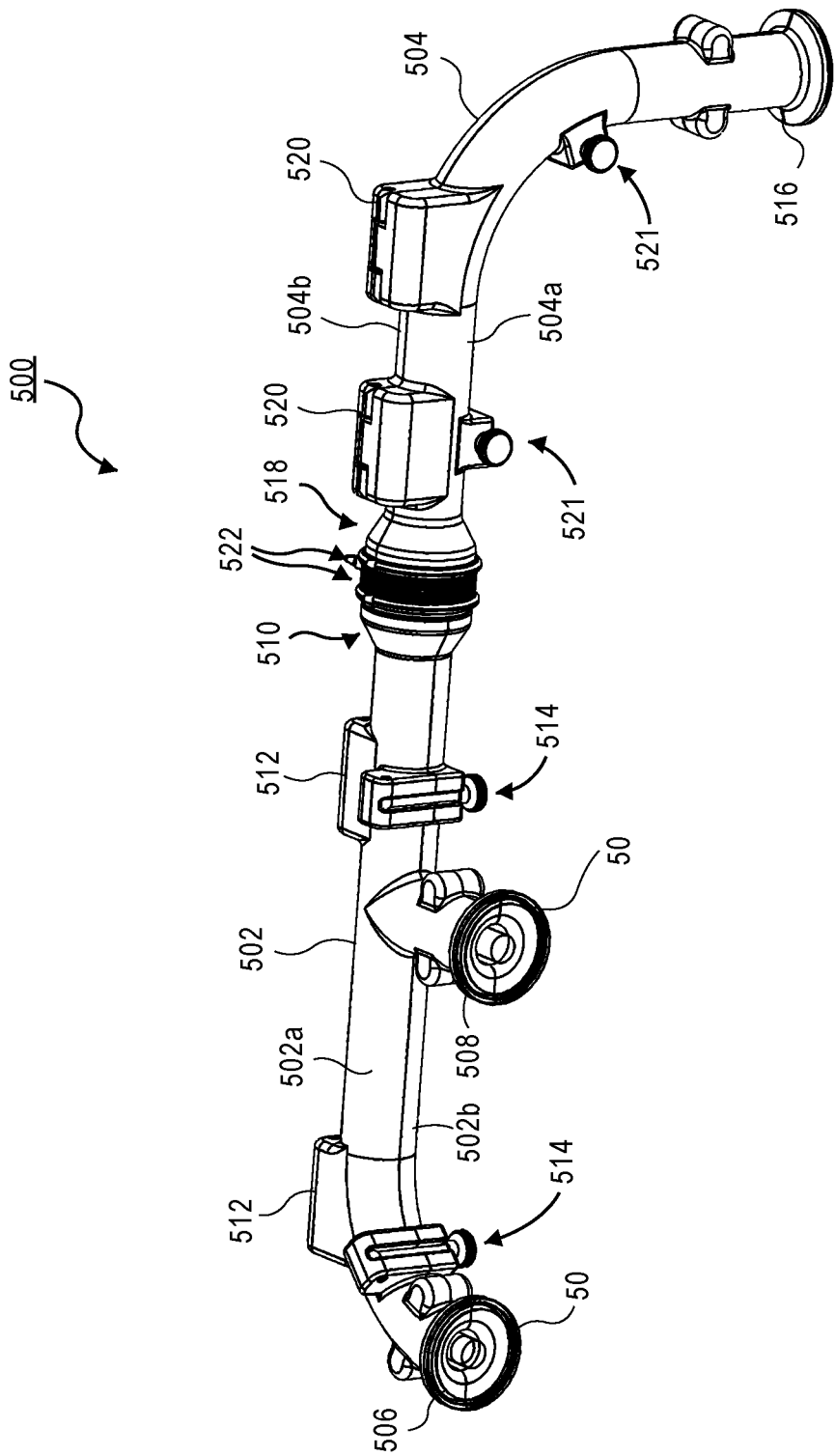
FIG. 16A illustrates another embodiment of a fluid management system that includes two separate two-part jackets that are connected to one another. In this embodiment, an end of one two-part jacket is inserted and locked axially relative to the other two-part jacket when in the closed state. In some embodiments (as is illustrated here), the two adjacent two-part jackets may still be able to rotate relative to each other at the interface.
Figure 16B:
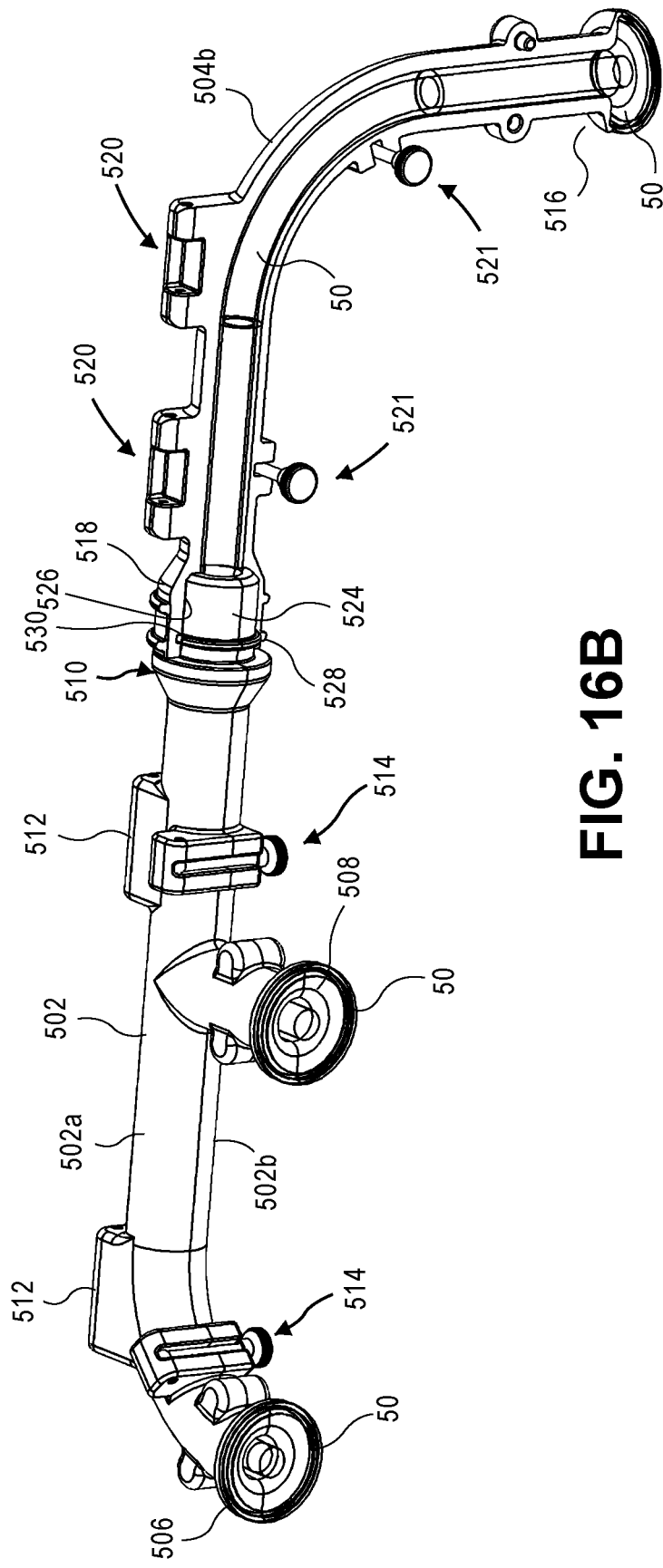
FIG. 16B is another view of the fluid management system of FIG. 16A with one half of one of the two-part jacket being removed to better illustrate the connection or interface between the two connected two-part jackets.

FIGS. 16A and 16B illustrate another embodiment of a fluid management assembly 500. In this embodiment, there are two (2) separate two-part jackets 502, 504 that are connected to one another. A segment of unreinforced polymer conduit 50 is contained within and encapsulated by the two-part jackets 502, 504. In this embodiment, one two-part jacket 502 includes two flanged ends 506, 508 along with an end 510 that interfaces with the adjacent two-part jacket 504. In addition, the two-part jacket 502 includes a first half 502*a* and a second half 502*b* that are secured to one another via hinges 512. Two fasteners 514 like those described herein (e.g., threaded latch and knob) are used to secure the two-part jacket 502 in the closed configuration. The other two-part jacket 504 includes a single flanged end 516 and an opposing end 518 that interfaces with the end 510 of the two-part jacket 502. The two-part jacket 504 includes a first half 504*a* and a second half 504*b* that are secured to one another via hinges 520. Two fasteners 521 like those described herein (e.g., threaded latch and knob) are used to secure the two-part jacket 504 in the closed configuration. As seen in FIG. 16A, the two ends 510, 518 of the two-part jackets 502, 504 are secured to one another using a "male" located at the end 510 of the two-part jacket 502 that is inserted into the "female" end of the end 518 of the two-part jacket 504. A pair of ties 522 are disposed about the periphery of the end 518 of the two-part jacket 504 to secure the two ends 510, 518 together.

FIG. 16B illustrates another view of the same fluid management assembly 500 of FIG. 16A but has the first half 504a of the two-part jacket 504 removed better illustrating the connection between the end 510 of the two-part jackets 502 with the end 518 of the other two-part jacket 504. As seen in FIG. 16B, end 510 includes a male end 524 that extends into a female end 526 that is formed within end 518 of the two-part jacket 504. The male end 524 further includes a radial ring 528 that extends around the periphery of the male end 524 and resides around an annular groove 530 that is formed on the inner surface of the female end 526. In this embodiment, while the two-part jackets 502, 504 are secured to one another in a fluid-tight arrangement, the jackets 502, 504 may be rotated relative to each other about the connection. It should be understood that the interface, namely the interface between the male end 524 and the female end 526 may be used with other two-part jackets and components that are described herein. The male/female interface may be used as an alternative to using separate clamps such as clamps 35 in FIG. 1B, clamp 540 in FIG. 16D, or the clamps 368 in FIGS. 10A-10C.

FIG. 16C illustrates a two-part valve body 532 having three valves 534a, 534b, 534c secured thereto using clamps 536. The valves 534a, 534b, 534c are located in two-part valve body 532 such that actuation of a valve modulates the flow of fluid through branch conduit lines 50a, 50b, 50c. For example, actuation of valve 534a can close (or open) flow to branch conduit line 50a. In this example, a two-part jacket 538 is secured to the two-part valve body 532 using a clamp 540. The clamp 540 is illustrated in FIG. 16D and includes generally circular body portion 542 that is divided at opening 544. A threaded latch 546 with a knob or nut 548 is secured to one side of the body portion 542 and can pivot to place the latch 546 into a slot or groove whereby tightening of the knob or nut 548 tightens the clamp 540. In this embodiment, the two-part valve body 532 interfaces with the end of the two-part jacket 538 using mating flanges such as those described herein and the clamp 540 is secured around the flanges to secure the two components to one another.

Figure 17:
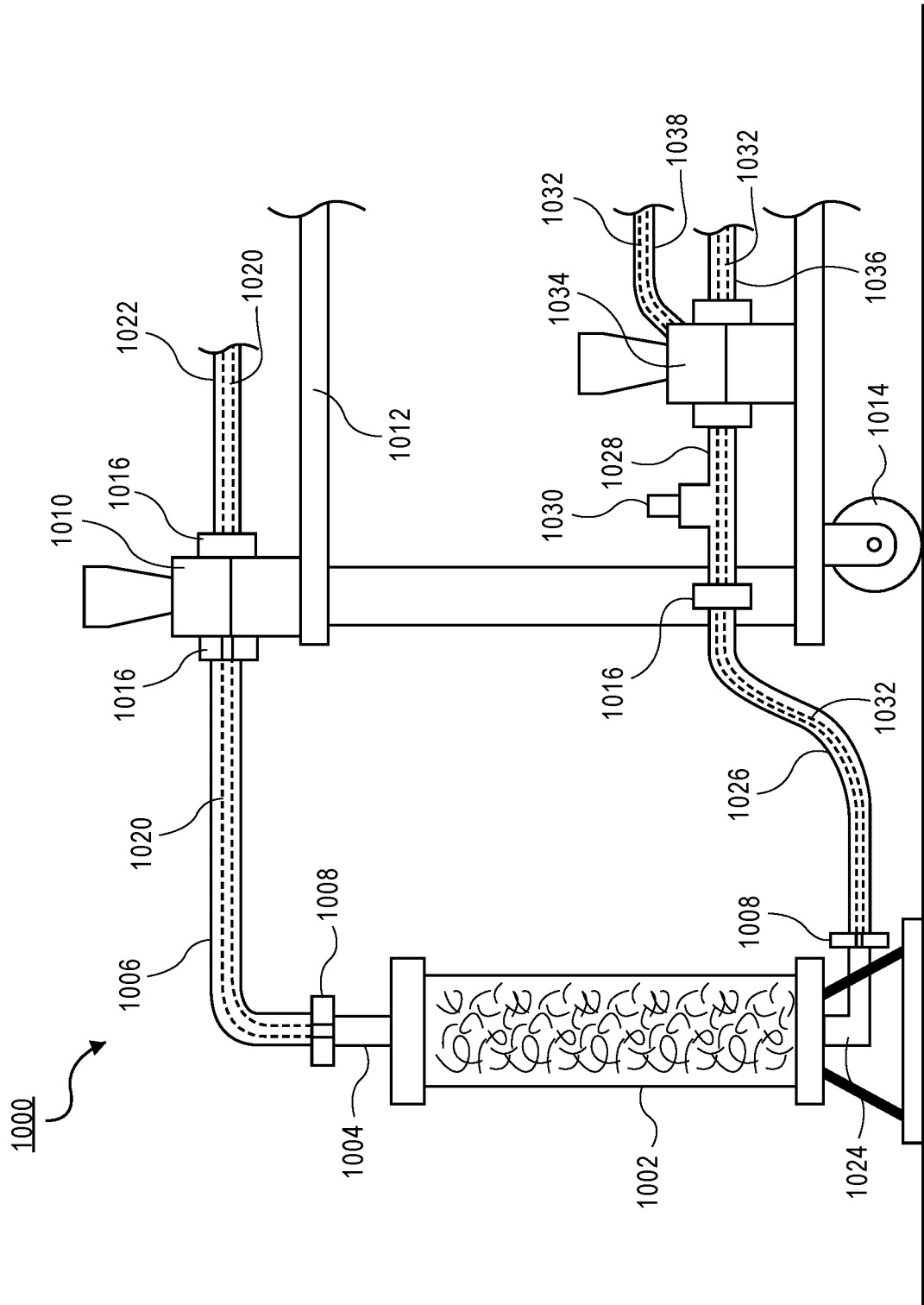
FIG. 17 illustrates one embodiment of a fluid management system that incorporates a chromatography unit and various encapsulating jackets and valves.

FIG. 17 illustrates an illustrative fluid management assembly 1000 according to another embodiment that incorporates one or more process components or subunits 1002. In this particular example, the process subunit 1002 is a chromatography unit. The chromatography unit 1002 may be used to capture and later elute a particular target of interest. The target of interest may include a molecule, cell, virus, or other target of interest. The chromatography unit 1002 is typically packed with a resin that is selective to bind to the particular target of interest. After the target of interest has bound to the resin, the bound targets can then be eluted from the chromatography unit 1002 by passing an eluting fluid through the chromatography unit 1002.

FIG. 17 illustrates an inlet 1004 to the chromatography unit 1002 being connected to a two-part jacket 1006 via a connector 1008 (e.g., clamp or the like that is commonly used to connect such component such as clamp 368 illustrated in FIGS. 10A and 10C or clamp 540 of FIG. 16D). One end of the two-part jacket 1006 connects to the inlet 1004 of the chromatography unit 1002 while the second end of the two-part jacket 1006 connects to a two-part valve body 1010 that is mounted on a cart 1012. The cart 1012 may include caster wheels 1014 (or other wheels) as illustrated so that the cart 1012 can be moved as needed. The end of the two-part jacket 1006 that connects to the two-part valve body 1010 is secured to the same via a connector 1016 (e.g., clamp or the like that is commonly used to connect such component such as clamp 368 illustrated in FIGS. 10A and 10C or clamp 540 of FIG. 16D). The unreinforced polymer conduit 1020 is illustrated in FIG. 17 in dashed lines within the two-part jacket 1006. The opposing side of the two-part valve body 1010 is connected to another two-part jacket 1022 via a connector 1016. An unreinforced polymer conduit 1020 is illustrated in FIG. 17 in dashed lines within the two-part jacket 1022. The unreinforced polymer conduit 1020 may be the same (i.e., continuous) with the segment of unreinforced polymer conduit 1020 that is within the two-part jacket 1006. Alternatively, the unreinforced polymer conduit 1020 may be different from the segment of unreinforced polymer conduit 1020 that is within the two-part jacket 1006. For example, ends of different segments of unreinforced polymer conduit 1020 can be joined at the connectors 1016 using, for example, the flanged connections as described herein with respect to other embodiments.

Still referring to FIG. 17, the outlet 1024 of the chromatography unit 1002 is connected to a two-part jacket 1026 via a connector 1008. The two-part jacket 1026 is connected at the other end to another two-part jacket 1028 via a connector 1016. The two-part jacket 1028 in this embodiment contains therein a sensor 1030 which can be used to sense one or more parameters of the fluid exiting the chromatography unit 1002. For example, the sensor 1030 may include a pressure sensor, a pH sensor, a conductivity sensor, a turbidity sensor, and the like. As seen in FIG. 17, unreinforced polymer conduit 1032 is contained within the two-part jacket 1026, which in the illustrated embodiment is curved or s-shaped. This unreinforced polymer conduit 1032 may continue through the two-part jacket 1028 or, alternatively, a separate segment of unreinforced polymer conduit may be used in each respective jacket 1026, 1028.

Still referring to FIG. 17, the end of the two-part jacket 1028 connects to a two-part valve body 1034 via a connector 1016. The unreinforced polymer conduit 1032 may continue through the two-part valve body 1034 or a separate unreinforced polymer conduit 1032 may be used. In this embodiment, the two-part valve body 1034 is connected to additional two-part jackets 1036, 1038 that hold therein the unreinforced polymer conduit 1032 (or a different segment of unreinforced polymer conduit). The two-part jackets may be connected to the two-part valve body 1034 via a connector 1016 as described herein.

Note that this embodiment is just one example of how one particular process subunit 1002 is integrated into a larger system that incorporates multiple fluid management systems (e.g., multiple two-part jackets and two-part valve bodies). The process subunit 1002 and the various flow paths, connections, two-part valve bodies, and two-part jackets can be used in different configurations. This example is given to show how the various components may be integrated with one another as part of a process flow. Also, in the embodiment of FIG. 17, substantially all of the unreinforced polymer conduit is covered either by a two-part jacket or a two-part valve body. In some embodiments, for example, where pressure is low, the unreinforced polymer conduit may be un-jacketed and exposed to the external environment.

While a chromatography unit 1002 is illustrated in this embodiment, the two-part valve bodies 1010, 1034 and jackets 1006, 1022, 1026, 1036, 1038 described herein may be used in connection with a number of other operations and process units. Examples for purposes of illustration and not limitation, the two-part valve bodies and the jackets may be used in connection with a dilution unit, buffer preparation unit, fermentation unit, sampling unit, reagent feeding unit, mixing unit, fluid transfer unit, sensor unit, and the like.

With reference to the embodiment of FIG. 17, parts of the fluid management assembly 1000 may be single-use, disposable items while other components can be re-used. For example, in many manufacturing processes, production runs are done in a batch mode. After one batch is done, another batch reaction process can take place. In the system 1000 of FIG. 17, for example, the various two-part jackets 1006, 1022, 1026, 1036, 1038 and two-part valve bodies 1010, 1034 can be reused while the internal unreinforced polymer conduit segment(s) can be disposed of between batches or runs. In addition, in some embodiments, the sensor 1030 may be reusable between batches. For example, a single cart 1012 with the mounted hardware (e.g., valves, pumps, and the like) may be reused while the internal polymer conduit segment(s) that come into contact with reagents or products can be disposed of. In addition, the change of the internal polymer conduit segment(s) can be accomplished relatively quickly. These can be changed out by merely opening the two-part jackets 1006, 1022, 1026, 1036, 1038 and/or two-part valves 1010, 1034 using fasteners of the type described herein (e.g., threaded latch and knob) and removing the polymer conduit segment(s) and replacing the same. The jackets 1006, 1022, 1026, 1036, 1038 and valves 1010, 1034 may then be closed to encapsulate the polymer conduit segment(s) and another batch can be made. Note that in the embodiment in FIG. 17 relatively short segments are used to connect the various components. In prior art systems, reinforced, braided silicone was used and required long runs to avoid kinking of the tubing. The problem is that long runs of tubing have significant hold up volume. This hold up volume is wasteful and may contain a meaningful amount of reagents or reaction products that may represent a very large dollar amount. Systems 1000 of the type illustrated herein avoid wasting such valuable products because there is little or no hold up volume. As seen in FIG. 17, the fluid management system 1000 reduces hold up volume and the various components can be located close to one another without the need for long segments of tubing between adjacent components.

Figure 18A:
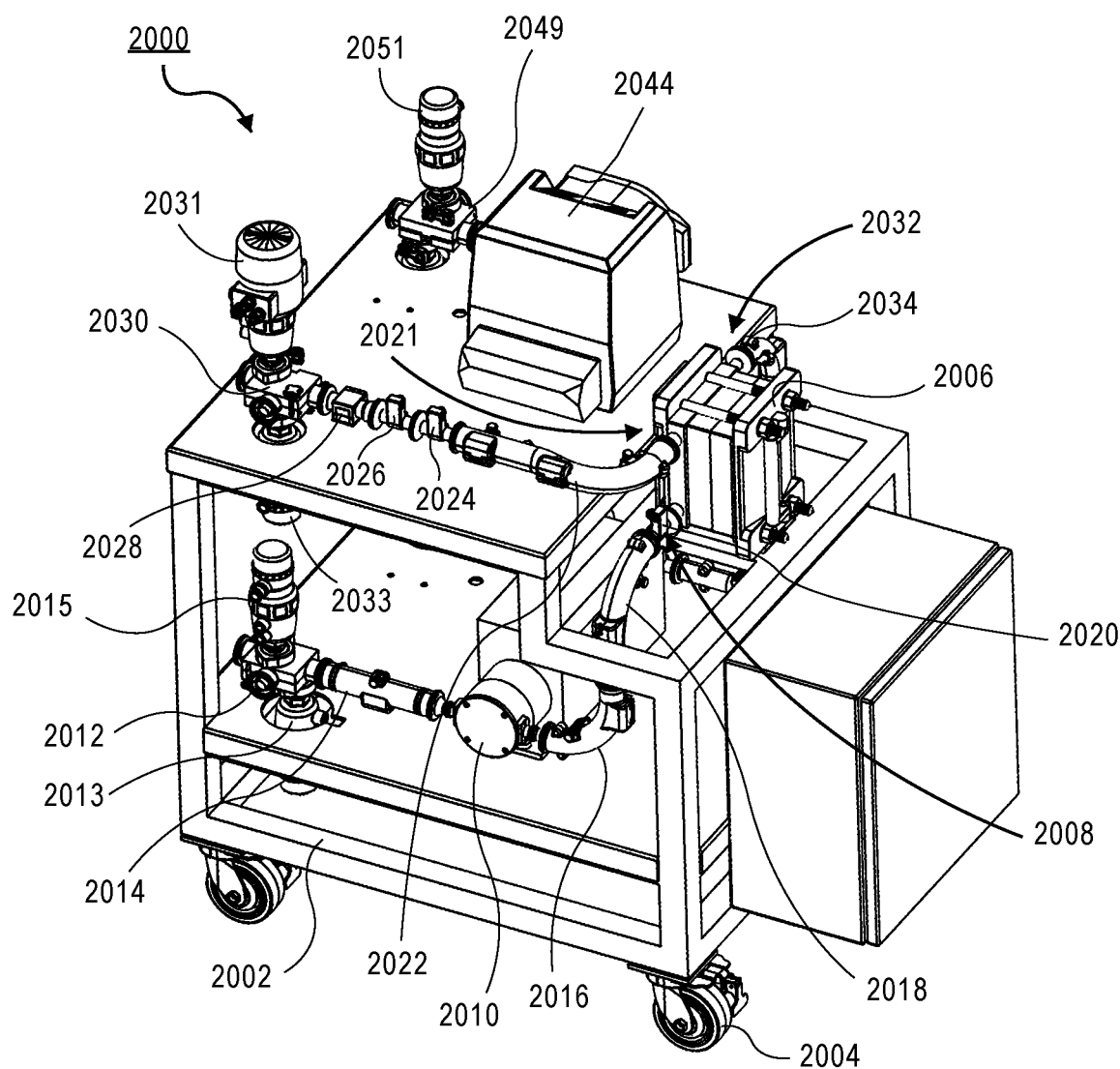
FIG. 18A illustrates a tangential flow filtration (TFF) system according to another embodiment that incorporates a number of two-part valve bodies and two-part jackets into the pressurized system.
Figure 18B:
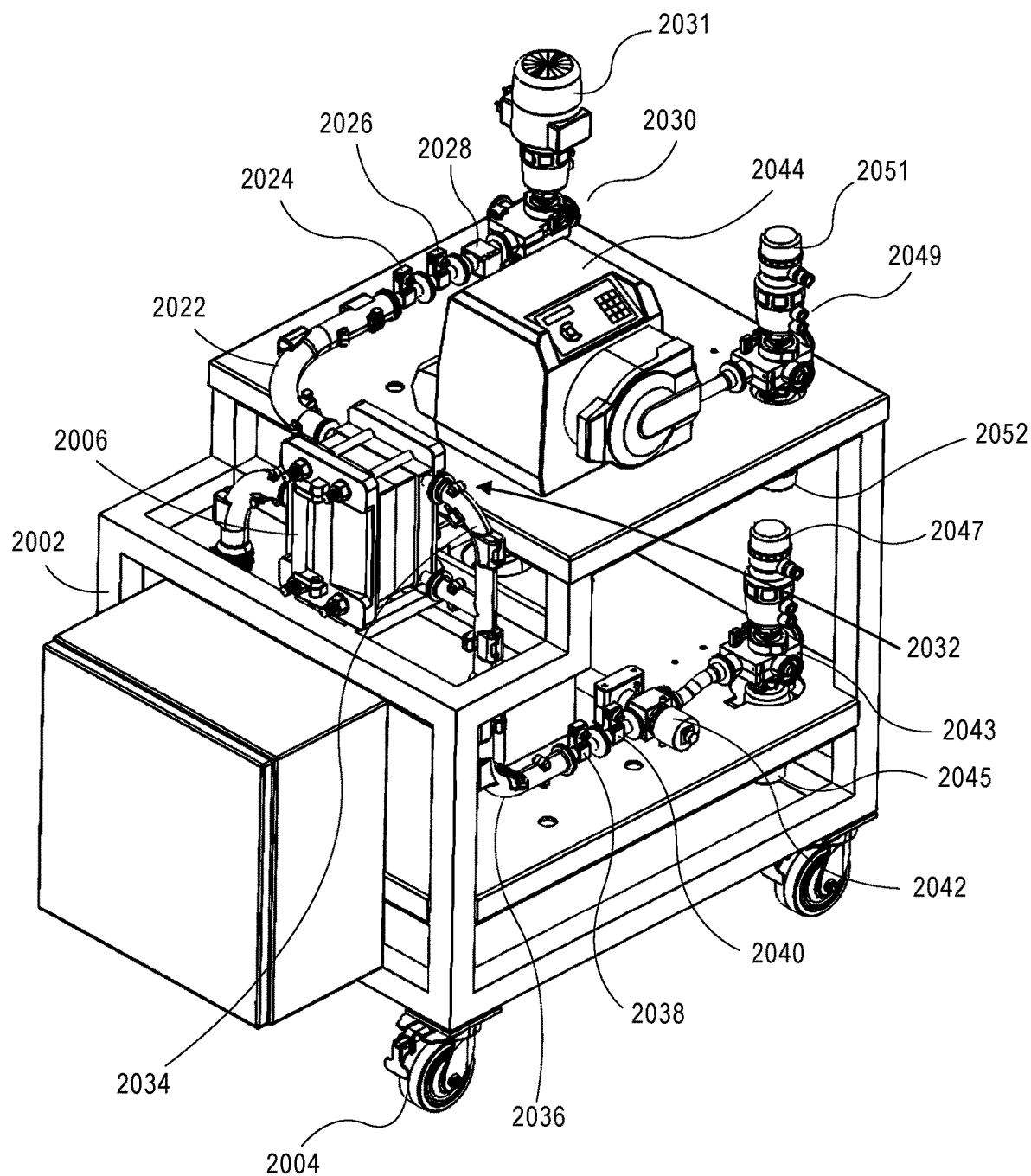
FIG. 18B illustrates a magnified perspective view of the TFF system.

FIGS. 18A-18B illustrate a tangential flow filtration (TFF) system 2000 according to another embodiment that incorporates fluid management devices of the type described herein. The TFF system 2000 includes a frame assembly cart 2002 that includes wheels 2004 (e.g., caster-type wheels). In this embodiment, a TFF holder assembly 2006 is used for tangential flow filtration and includes an inlet 2008 that receives pressured fluid from, for example, a batch process that is stored in an aseptic bag, tank, or the like. The TFF holder assembly 2006 incorporates a single-use polypropylene based feed/retentate/permeate distribution block. The TFF holder assembly 2006 may be obtained from, for example, ALPHABIO, INC. (Rancho Santa Margarita, Calif.). The TFF holder assembly 2006 includes a plurality of filter membranes that are used to selectively filter a desired product (e.g., a protein) from other products. Typically, the desired product has a larger molecular weight and is prevented from filtering through the membranes of the TFF holder assembly 2006 and remains in the retentate output of the TFF holder assembly 2006. The retentate output of the TFF holder assembly 2006 is then typically recycled back to the batch process storage container where the concentration is increased as the fluid continues to run through the TFF holder assembly 2006. The smaller-sized components in the feed solution are able to pass through the filter membranes and leave the TFF holder assembly 2006 via a separate permeate outlet. The permeate may be sampled via one or more sensors along the outlet pathway and then dumped as waste.

Figure 18C:
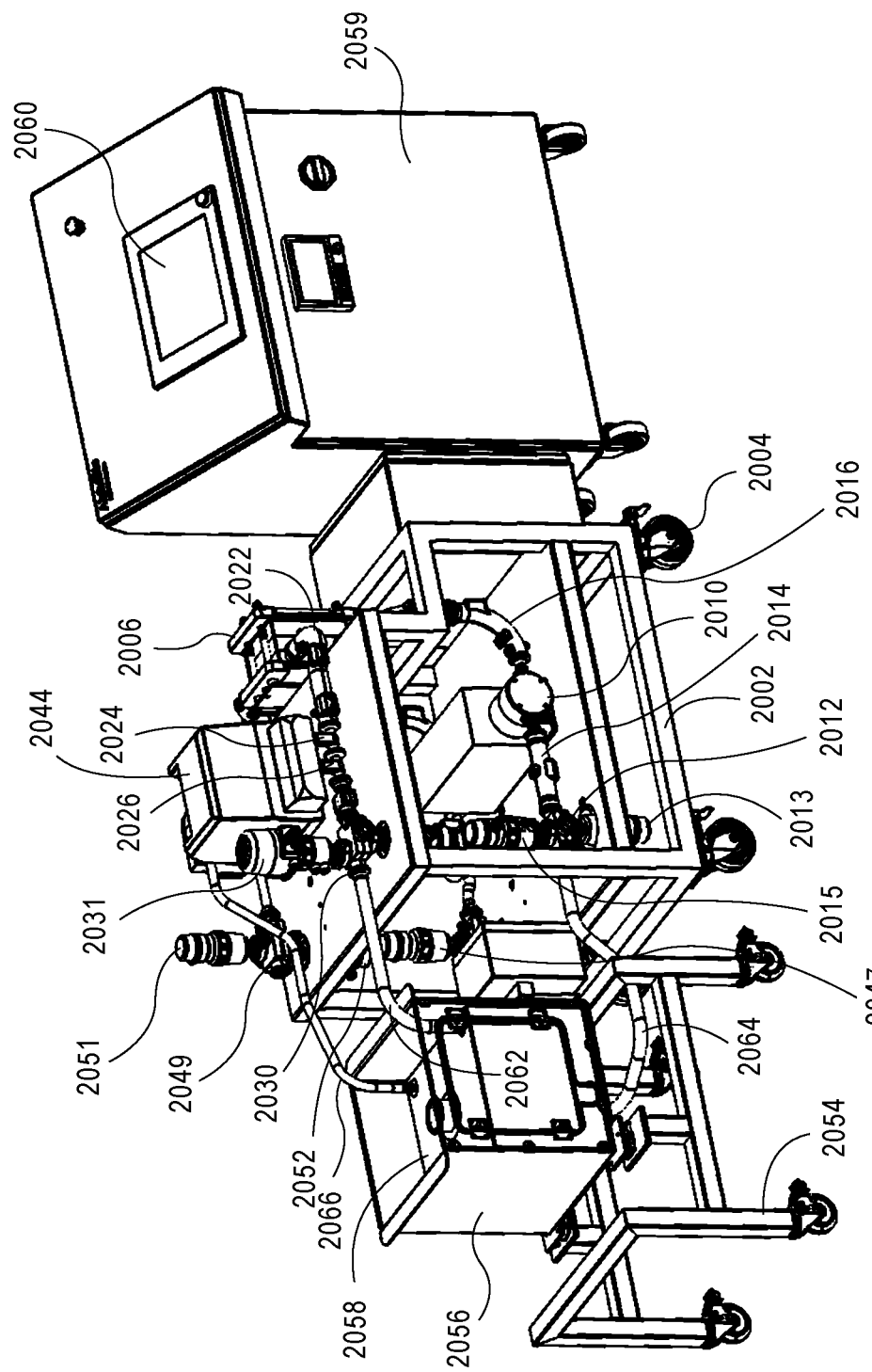
FIG. 18C illustrates a perspective view of the TFF system showing a connected tank (and cart) along with an associated console that is used to control the system (e.g., valves, pumps, etc.) and monitor feedback from sensors and other components.

FIGS. 18A, 18B, and 18C illustrates a pump 2010 (single-use, multi-chamber QUATTROFLOW™ diaphragm pump using single use polypropylene pump head; available from Holland Applied Technologies, Burr Ridge, Ill.), that is connected to a two-part pinch valve body 2012 (2-way divert pinch valve) via a two-part jacket 2014. The two-part pinch valve body 2012 includes two separate valves 2013, 2015. One valve 2013 controls flow to the pump 2010 while the other valve 2015 can be opened as needed for use as a low point drain or product collection port. Note that the two-part valves and two-part jackets described in this embodiment all encapsulate one or more segments of unreinforced conduit (e.g., silicone liner) that are used to carry fluid therein. The unreinforced conduits or liner(s) are not illustrated in FIGS. 18A-18B for clarity purposes, however, they are included and surrounded by the jackets, valves, and other components described herein. The output of the pump 2010 connects to a series of bending two-part jackets 2016, 2018 (note that this combination of jackets generates multiple bends along different axes). A pressure sensor 2020 is interposed between the connection of jacket 2018 and the inlet 2008 to the TFF holder assembly 2006. The TFF holder assembly 2006 has a pressurized retentate outlet 2021 that contains the retentate. The retentate, as explained herein, may be recirculated to concentrate or purify the concentration of a target which may include a drug, molecule, cell, bacterium, virus, or the like. The retentate is contained within a single use unreinforced conduit or liner (e.g., silicone) as described herein that is encapsulated by a two-part jacket 2022. A series of sensors 2024, 2026, 2028 are connected in-line with the jacket 2022 to measure flow, pressure, and conductivity, respectively. A two-part valve 2030 connects to the last of the sensors 2028. In this embodiment, the two-part valve 2030 includes two separate valves 2031, 2033. One valve 2031 is used to modulate the degree of opening of unreinforced conduit contained therein (e.g., 5% closed, 30% closed, 75% closed, etc.) so that pressure and flow within the system can be controlled. In this regard, the valve 2031 can modulate or control pressures within the system by varying the degree to which the valve 2031 is open or closed. The other valve 2033 is used to shunt or divert flow to a port that can be used, for example, for sampling the retentate. While not illustrated in FIG. 18A, the outlet from the two-part valve 2030 returns the retentate fluid to the aseptic bag, tank, or the like which is drawn from using pump 2010 as described above (see FIG. 18C). This return path may also contain one or more two-part jackets like those described herein which contain unreinforced conduit in which the pressurized fluid flows.

The TFF holder 2006 also includes a permeate outlet 2032 (best seen in FIG. 18B) that is pressurized and is contained within another two-part jacket 2034. In this particular embodiment, there are two permeate outlets 2032 that combine into a single outlet all of which is contained within the two-part jacket 2034. The permeate, in one aspect, may correspond to a waste solution that is discarded. As seen in FIG. 18B, the two-part jacket 2034 connects to another two-part jacket 2036. A combined conductivity/temperature sensor 2038 and pressure sensor 2040 is interposed between the two-part jacket 2036 and a UV optical lamp/detector assembly 2042. These sensors 2038, 2040, 2042 are used to monitor conditions of the permeate. As seen in FIG. 18B, the permeate continues to another two-part valve 2043. The two-part valve 2043 includes two valves 2045, 2047 for diverting fluid either to a stream waste or to a sample port.

As seen in FIG. 18B, a peristaltic pump 2044 (e.g., Watson-Marlow/Bredel 620 Series with control range of 0.01-16.0 LPM flow) is illustrated that is used to pump fluid from another aseptic bag or other container that contains product and a buffer solution that is run through the TFF system 2000. The fluid is pumped into the aseptic bag, tank, or the like that was described above and used a source of fluid for the TFF system 2000. As seen in FIG. 18B, the peristaltic pump 2044 is connected to a two-part valve 2049. The two-part valve 2049 is coupled at one port to a product feed. The other port of the two-part valve 2049 is coupled to a source of buffer solution or the like. The two-part valve 2049 includes two valves 2051, 2052 that can be used to modulate the flow of product and/or buffer that is pumped into the common bag, tank, or the like from which is run through the TFF system 2000.

FIG. 18C illustrates a tangential flow filtration (TFF) system 2000 in which another cart 2054 containing a tank 2056 thereon that stores a container 2058 (tank, bag, or the like) or the like that is used to recycle the retentate. FIG. 18C also illustrates a console 2059 that contains one or more displays 2060 or the like that can be used to view operational parameters as well as control (e.g., touch screens) and program operations of the system. The console 2059 contains the electronics and control systems for operating the pumps 2010, 2044, valves, sensors, and the like. As see in FIG. 18C, another two-part jacket 2062 (or multiple jackets connected to one another) connects to the output of valve 2030 at one end and connects to the container 2058 at the other. As explained above, retentate fluid is returned to the container 2058 via this line. Another two-part jacket 2064 (or multiple jackets connected to one another) connects from a low point of the container 2058 to the two-part valve 2012. This line is used to withdraw fluid from the container 2058 and pass through pump 2010 to the TFF holder assembly 2006. Still referring to FIG. 18C, another two-part jacket 2066 (or multiple jackets) connects to the top or upper region of the container 2058 at one end and connects to the peristaltic pump 2044 at the other end. The peristaltic pump 2044 delivers product and/or buffer solution that first enters the two-part valve 2049 (from a connection on-site or another container (not shown) connected thereto and then continues through peristaltic pump 2044 and enters the container 2058.

Figure 19A:
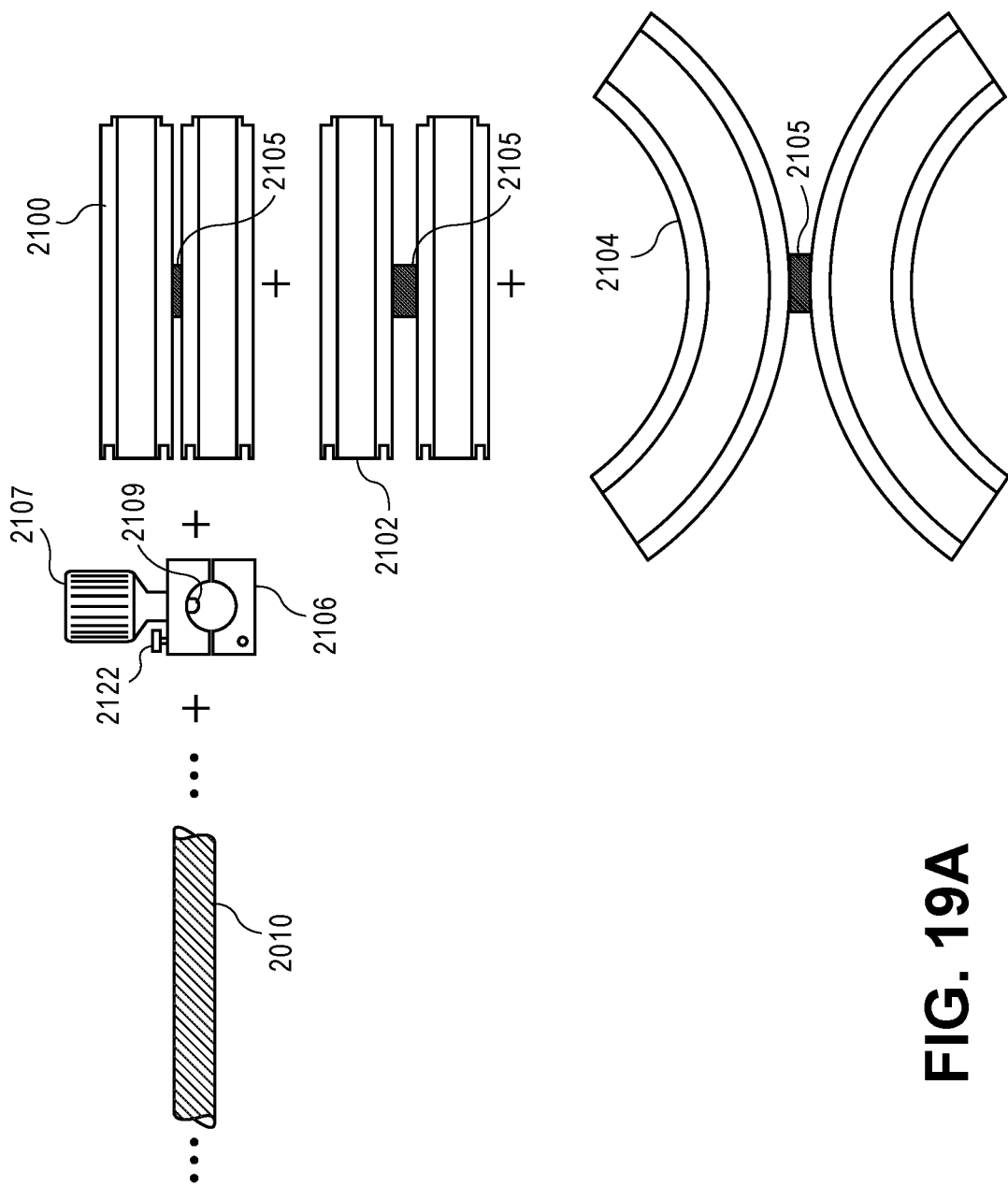
FIG. 19A illustrates a collection of components or devices that may be integrated together as part of a fluid management system. An unreinforced conduit is illustrated along with a two-part valve body and multiple two-part jackets (two straight and one curved).
Figure 19B:
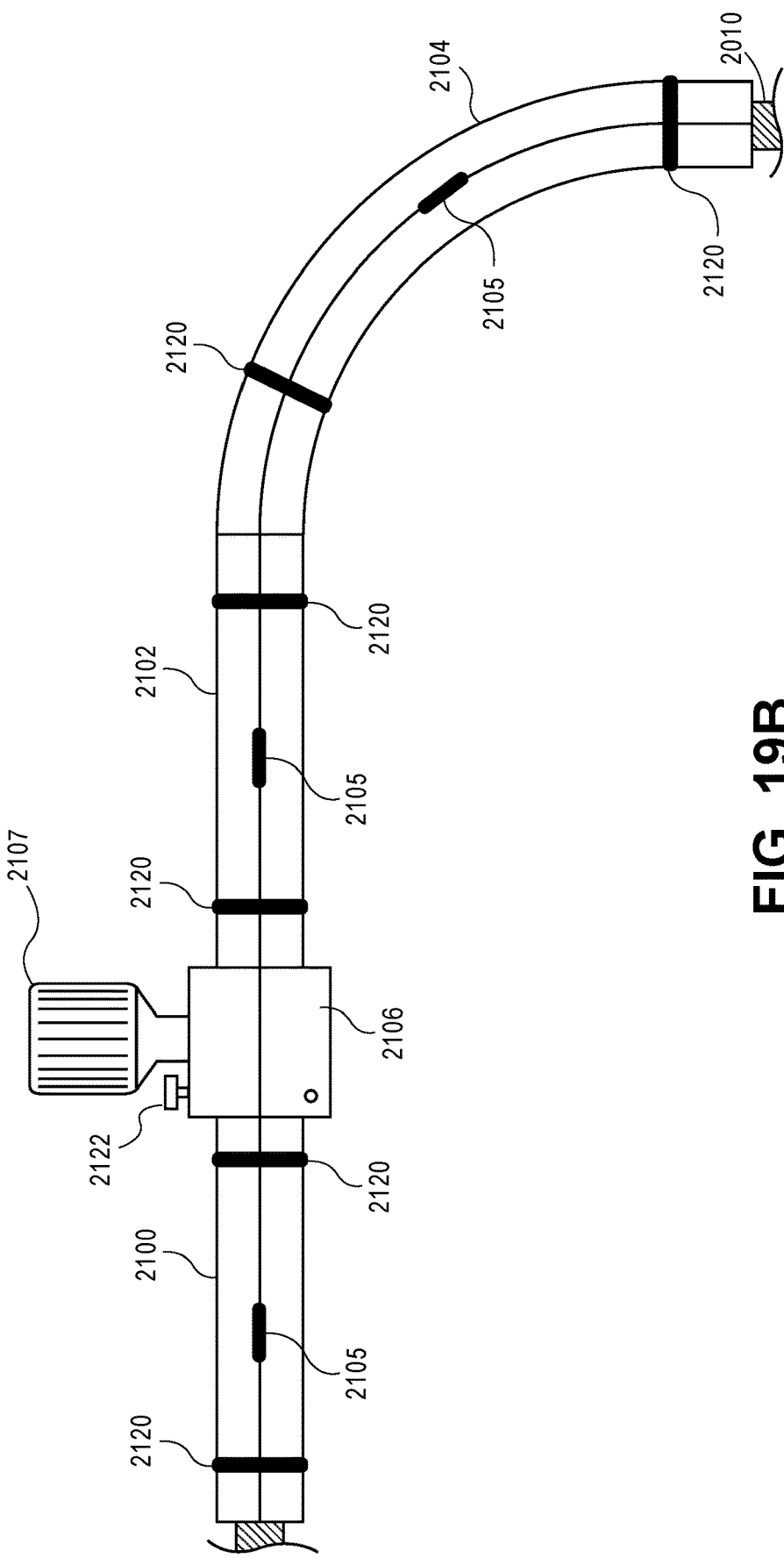
FIG. 19B illustrates the collection of components or devices from FIG. 19A being assembled together.

FIGS. 19A and 19B illustrate the modular nature of the fluid management systems described herein. FIG. 19A illustrates how various modular two-part jackets 2100, 2102, 2104 and a two-part valve 2106 can be connected together to produce a desired flow path in for a segment of unreinforced polymer conduit 2010. The two-part valve 2106 is illustrated with bonnet 2107 that actuates an actuator 2109 to pinch the unreinforced polymer conduit 2010. Each jacket 2100, 2102, 2104 has a hinge 2105 (or multiple hinges) for securing the respective halves together. The unreinforced polymer conduit 2010 may carry a fluid under high pressure. The jackets and valve which surround the unreinforced polymer conduit 2010 prevent the same from failing or expanding due to the high fluid pressure contained in the system. The jackets 2100, 2102, 2104 (and valve 2106) act as a sort of exoskeleton to resist the radial pressures exerted on the unreinforced polymer conduit 2010 by the pressurized fluid. There is no need for reinforced tubing or reinforced conduits as the unreinforced polymer conduit 2010 is jacketed by the jackets 2100, 2102, 2104 and valve 2106. Of course, this is a relatively simple example of the constructed flow path but it demonstrates the modular nature of how a series of two-part jackets and valves can be arranged about a segment (or multiple segments) of unreinforced polymer conduit 2010.

Thus, it should be appreciated that the two-part jackets described herein may be positioned about the unreinforced polymer conduit at a variety of locations depending on the particular use and application. Two-part jackets may be connected in an end-to-end arrangement with one another along longer runs or segments of unreinforced polymer conduit. The two-part jackets may further connect to various other components that are positioned in-line within the process. This includes by way of example, pumps, filters, separators, tanks, sensors, valves, manifolds, columns, and the like. The system is designed so that personnel can quickly assemble and disassemble the system (or portions of the system) by opening the outer jackets/valves and replacing the unreinforced polymer conduit with a new unreinforced polymer conduit. The two-part jackets, valves, and the like can then be closed around the new unreinforced polymer conduit and secured in place for the next batch or production run.

As seen in FIG. 19A, a segment of unreinforced polymer conduit 2010 is provided that is to be encapsulated in the two-part valve 2106 along with the two-part jackets 2100, 2102, 2104. In this example, a curved two-part jacket 2014 is used to change the flow path direction after a straight two-part jacket 2012. FIG. 19B illustrates the two-part jackets 2100, 2102, 2104 and the two-part valve 2106 mounted on the unreinforced polymer conduit 2010 and secured in the closed state. The two-part jackets 2100, 2102, 2104 may include fasteners 2120 mounted on their periphery to maintain the two-part jackets 2100, 2102, 2104. Likewise, the two-part valve 2106 includes a fastener 2122 for securing the same in a closed state. The fastener can include a threaded latch and knob as previously described herein.

For all of the embodiments described herein as well as variations thereof, for polymer-based components (e.g., two-part jacket or two-part valve body), the components can be produced using three-dimensional printing technology. This enables parts to be created with custom designed shapes and sizes to meet customer requirements and applications. To produce the parts, an electronic file is created of the object to be printed. The electronic file may be any number of file types including, but not limited to, OBJ, STL, VRML, X3G, FBX, AMF, and the like.

The unreinforced conduits or liners that are described herein may be used in applications requiring sterile conditions or conditions merely requiring bioburden reduction. In either case, the unreinforced conduits or liners are typically subject to sterilization or bioburden reduction process. These may include, for example, exposing the unreinforced conduits or liners to ozone, ethylene oxide, gamma irradiation, or x-ray irradiation. The unreinforced conduits or liners are typically packaged or stored in a bag or double-bagged which are then opened at the site of assembly. The jackets and valves described herein need not necessarily be sterilized or subject to a bioburden reduction process similar to that used for the unreinforced conduits or liners. Instead, the valves and jackets can be subject to less rigorous and conventional preparation process such as wiping down or subject to hydrogen peroxide fogging, or the like.

While embodiments of the present invention have been shown and described, various modifications may be made without departing from the scope of the present invention. For example, various methods of connecting two-part jackets to one another or to other components (e.g., valves) have been disclosed herein. Some methods rely on clamps that surround adjacent flanges to connect adjacent components. Other methods described herein use a "male" protuberance or end in one component that fits into a corresponding "female" groove, recess, or aperture of an adjacent component. Some methods using the male and female arrangement permit rotation between two adjacent components. It should be noted that these are alternative methods to secure adjacent components to one another and that these can be substituted for one another. In this manner, regardless of the particular interface used to connect adjacent components specifically described herein and illustrated in the drawings it should be understood that different attachment schemes can be employed (or substituted) with other described embodiments. Likewise, while various embodiments illustrate hinges holding together the two-part jackets an alternative would be to omit the hinge(s) and use a dowel/recess construction such as that illustrated in FIG. 15D. The dowel/recess alternative could be used in other embodiments described herein. The invention, therefore, should not be limited, except to the following claims, and their equivalents.

What is claimed is:

1. A fluid management system for handling pressurized fluid within a fluidized pharmaceutical or biological production process, the system comprising:

a length of unreinforced flexible polymer conduit having a lumen therein dimensioned to carry the pressurized fluid in connection with a pharmaceutical or biological production process;

a plurality of two-part jackets disposed along the length of the unreinforced flexible polymer conduit and secured to one another in an end-to-end configuration, wherein each of the plurality of two-part jackets comprises a rigid polymer-based two-part rigid jacket comprising a first half and a second half joined together via a hinge, the first half and the second half each defining an inner surface, the first half and the second half configured to mate with each other with their respective inner surfaces together defining a circular passageway through the respective two-part rigid jacket which matches the exterior shape of the unreinforced flexible polymer conduit and contacts and surrounds the unreinforced flexible polymer conduit to snugly encapsulate the unreinforced flexible polymer conduit and provide resistance to expansion of the unreinforced flexible polymer conduit; and at least one fastener disposed on at least one of the first half or the second half of each of the plurality of two-part rigid jackets, the at least one fastener configured to hold the first half and the second half of each respective two-part rigid jacket securely about the unreinforced flexible polymer conduit.

2. The fluid management system of claim 1, wherein adjacent two-part rigid jackets are connected to one another at points of connection with at least one of the two-part rigid jackets including a male end that is secured to a female end located in the adjacent two-part rigid jacket with the male end contained within and encapsulated by the female end of the adjacent two-part rigid jacket when in a closed state.

3. The fluid management system of claim 2, wherein the adjacent two-part rigid jackets are rotatable relatively to each other in a closed state.

4. The fluid management system of claim 2, wherein the adjacent two-part rigid jackets are further connected via a clamp.

5. The fluid management system of claim 1, wherein at least one of the plurality of two-part rigid jackets has a straight shape along a long axis of the respective two-part rigid jacket.

6. The fluid management system of claim 1, wherein at least one of the plurality of two-part rigid jackets has a curved shape along a long axis of the respective two-part rigid jacket.

7. The fluid management system of claim 1, wherein at least one of the plurality of two-part rigid jackets is Tee shaped and wherein the passageway comprises orthogonally intersecting passageways.

8. The fluid management system of claim 1, wherein the fastener comprises a threaded latch and knob disposed on the threaded latch.

9. The fluid management system of claim 1, wherein the fastener comprises a tie.

10. The fluid management system of claim 1, wherein the length of unreinforced flexible polymer conduit comprises a thermoplastic elastomer (TPE), thermoplastic rubber (TPR), or silicone.

11. The fluid management system of claim 1, further comprising a sensor housing disposed in one of the plurality of two-part rigid jackets, the sensor housing configured to receive a pressure sensor therein configured to measure the pressure inside the lumen of the unreinforced flexible polymer conduit.

12. The fluid management system of claim 1, wherein the first half and the second half of the two-part rigid jacket each define a semi-circular inner surface together defining a circular passageway when the first half and the second half are mated together.

13. The fluid management system of claim 1, wherein the first half and the second half are secured about the unreinforced flexible polymer conduit to prevent the unreinforced flexible polymer conduit from failing under high pressures.

* * * * *